US011330194B2

(12) United States Patent
Sun et al.

(10) Patent No.: US 11,330,194 B2
(45) Date of Patent: *May 10, 2022

(54) PHOTOGRAPHING USING NIGHT SHOT MODE PROCESSING AND USER INTERFACE

(71) Applicant: Huawei Technologies Co., Ltd., Shenzhen (CN)

(72) Inventors: Tao Sun, Beijing (CN); Congchao Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,615

(22) Filed: Feb. 3, 2021

(65) Prior Publication Data

US 2021/0168302 A1   Jun. 3, 2021

Related U.S. Application Data

(63) Continuation of application No. 16/623,285, filed as application No. PCT/CN2018/080747 on Mar. 27, 2018, now Pat. No. 11,070,743.

(51) Int. Cl.
*H04N 5/243* (2006.01)
*H04N 5/235* (2006.01)

(52) U.S. Cl.
CPC ........... *H04N 5/243* (2013.01); *H04N 5/2351* (2013.01)

(58) Field of Classification Search
CPC .. H04N 5/243; H04N 5/2351; H04N 5/23222; H04N 5/23245; H04N 5/2356; H04N 5/23232; H04N 5/232939; H04N 5/2355; H04N 5/235; H04N 5/232935
See application file for complete search history.

(56) References Cited

U.S. PATENT DOCUMENTS

| | | | |
|---|---|---|---|
| 6,272,289 B1 | 8/2001 | Washisu | |
| 7,098,946 B1 * | 8/2006 | Koseki | ............. H04N 5/232939 |
| | | | 348/229.1 |
| 8,294,813 B2 * | 10/2012 | Kawaguchi | ........ H04N 5/23216 |
| | | | 348/371 |

(Continued)

FOREIGN PATENT DOCUMENTS

| | | |
|---|---|---|
| CN | 101394485 A | 3/2009 |
| CN | 101420531 A | 4/2009 |

(Continued)

OTHER PUBLICATIONS

Muye, "Surf algorithm feature point detection and matching," Retrieved from Internet: https://blog.csdn.net/dcrmg/article/details/52601010, Last published on Sep. 20, 2016, 23 pages, with 13 pages English translation.

*Primary Examiner* — Luong T Nguyen
(74) *Attorney, Agent, or Firm* — Conley Rose, P.C.

(57) ABSTRACT

In a night shot mode, a photo is captured and processed based on a plurality of frames. The plurality of frames is obtained based on a plurality of parameters including an exposure duration, a light sensitivity, and a number of frames. These parameters are determined based on factors, such as whether the electronic device is in a handheld state or not, and whether the current photographing scene is a dark scene or a light source scene.

20 Claims, 13 Drawing Sheets

(56) References Cited

U.S. PATENT DOCUMENTS

| | | | |
|---|---|---|---|
| 8,537,224 B2 | 9/2013 | Sobol | |
| 9,143,679 B2 | 9/2015 | Sudo et al. | |
| 10,412,307 B2 | 9/2019 | Gao | |
| 11,070,743 B2* | 7/2021 | Sun | H04N 5/2351 |
| 2003/0206240 A1 | 11/2003 | Hyodo et al. | |
| 2004/0008272 A1 | 1/2004 | Tang | |
| 2006/0170781 A1 | 8/2006 | Sobol | |
| 2009/0080791 A1 | 3/2009 | Chen et al. | |
| 2009/0102945 A1 | 4/2009 | Chen | |
| 2009/0160968 A1* | 6/2009 | Prentice | H04N 5/243 348/223.1 |
| 2009/0185041 A1 | 7/2009 | Kang et al. | |
| 2009/0290028 A1 | 11/2009 | Yamasaki | |
| 2010/0134651 A1 | 6/2010 | Morimoto | |
| 2010/0201848 A1 | 8/2010 | Fukui | |
| 2010/0259636 A1 | 10/2010 | Tzur et al. | |
| 2011/0099486 A1 | 4/2011 | Nesladek et al. | |
| 2011/0249146 A1 | 10/2011 | Ishida | |
| 2012/0133797 A1 | 5/2012 | Sato et al. | |
| 2012/0287310 A1* | 11/2012 | Fujii | H04N 5/2327 348/239 |
| 2013/0194447 A1 | 8/2013 | Sudo et al. | |
| 2013/0194456 A1 | 8/2013 | Abe | |
| 2013/0314563 A1 | 11/2013 | Abe et al. | |
| 2014/0063286 A1 | 3/2014 | Okada et al. | |
| 2014/0168462 A1 | 6/2014 | Silberstein | |
| 2015/0077603 A1 | 3/2015 | Matsuzawa et al. | |
| 2015/0170389 A1 | 6/2015 | Ming et al. | |
| 2015/0189180 A1 | 7/2015 | Sudo | |
| 2016/0100103 A1 | 4/2016 | Takahashi | |
| 2016/0301876 A1 | 10/2016 | Gao | |
| 2017/0171446 A1 | 6/2017 | Nashizawa | |
| 2017/0201692 A1 | 7/2017 | Wu | |
| 2017/0278229 A1 | 9/2017 | Zhu et al. | |
| 2017/0278546 A1 | 9/2017 | Xiao et al. | |

FOREIGN PATENT DOCUMENTS

| | | |
|---|---|---|
| CN | 101594464 A | 12/2009 |
| CN | 101895684 A | 11/2010 |
| CN | 102215342 A | 10/2011 |
| CN | 102792664 A | 11/2012 |
| CN | 103118229 A | 5/2013 |
| CN | 103227896 A | 7/2013 |
| CN | 102404495 B | 3/2014 |
| CN | 103685974 A | 3/2014 |
| CN | 103841323 A | 6/2014 |
| CN | 103986874 A | 8/2014 |
| CN | 104182313 A | 12/2014 |
| CN | 104301612 A | 1/2015 |
| CN | 104853112 A | 8/2015 |
| CN | 104869314 A | 8/2015 |
| CN | 104902189 A | 9/2015 |
| CN | 105516609 A | 4/2016 |
| CN | 105528146 A | 4/2016 |
| CN | 105556957 A | 5/2016 |
| CN | 105791707 A | 7/2016 |
| CN | 106060418 A | 10/2016 |
| CN | 106303272 A | 1/2017 |
| CN | 106454135 A | 2/2017 |
| CN | 106454145 A | 2/2017 |
| CN | 106686319 A | 5/2017 |
| CN | 106933620 A | 7/2017 |
| CN | 107241559 A | 10/2017 |
| CN | 107257436 A | 10/2017 |
| CN | 107566748 A | 1/2018 |
| CN | 107613191 A | 1/2018 |
| CN | 107770438 A | 3/2018 |
| CN | 107809591 A | 3/2018 |
| CN | 107819991 A | 3/2018 |
| EP | 2214404 A1 | 8/2010 |
| EP | 2985991 B1 | 11/2018 |
| JP | 2006215556 A | 8/2006 |
| JP | 2007101860 A | 4/2007 |
| JP | 2010193099 A | 9/2010 |
| JP | 2013085140 A | 5/2013 |
| JP | 2013157918 A | 8/2013 |
| JP | 2013186879 A | 9/2013 |
| JP | 2014049990 A | 3/2014 |
| JP | 2014239396 A | 12/2014 |
| JP | 2017195003 A | 10/2017 |
| KR | 100726256 B1 | 6/2007 |
| KR | 20090080616 A | 7/2009 |
| KR | 20150008118 A | 1/2015 |
| KR | 20150095165 A | 8/2015 |
| WO | 2013094087 A1 | 6/2013 |
| WO | 2017076000 A1 | 5/2017 |

* cited by examiner

| | | |
|---|---|---|
| 5 | 5 | 60 |
| 80 | 250 | 250 |

PHOTOGRAPHING USING NIGHT SHOT MODE PROCESSING AND USER INTERFACE

CROSS-REFERENCE TO RELATED APPLICATIONS

This application is a continuation of U.S. patent application Ser. No. 16/623,285 filed on Dec. 16, 2019, which is a National Stage of International Patent Application No. PCT/CN2018/080747 filed on Mar. 27, 2018. Both of the aforementioned applications are hereby incorporated by reference in their entireties.

TECHNICAL FIELD

Embodiments of this application relate to the terminal field, and more specifically, to a photographing method, a photographing apparatus, and a mobile terminal in the terminal field.

BACKGROUND

With continuous development of photographing technologies and widespread use of mobile terminals, a photographing function of a mobile terminal is increasingly favored by people. An existing mobile terminal can provide an automatic photographing mode or a mode in which a user can manually set a photographing parameter.

When light surrounding a photographed object is relatively weak or severe shaking occurs when a user takes a photo, an effect of the photo taken in the automatic photographing mode of the mobile terminal is usually relatively poor. As shown in FIG. 1, when a hand of a user shakes during photographing, an obtained photo is relatively blurred. As shown in FIG. 2, when light is relatively poor, an obtained photo has severe noise. Although the existing mobile terminal also provides the mode of manually setting a photographing parameter, because a common user has an insufficient understanding of a photographing technology, it is very difficult for the common user to manually set various photographing parameters based on different scenarios. Therefore, a photographing effect of an image is relatively poor when photographing is performed by using the automatic photographing mode of the existing mobile terminal.

SUMMARY

This application provides a photographing method, a photographing apparatus, and a mobile terminal, to improve a photographing effect of an image.

According to a first aspect, an embodiment of this application provides a photographing method. The method includes: obtaining, by a mobile terminal, a previewed first image; determining, by the mobile terminal, a current photographing mode, where the photographing mode includes a photographing status and a photographing scene, the photographing status includes a handheld state or a tripod state, and the photographing scene includes a light source scene or a dark scene; determining, by the mobile terminal, an exposure parameter sequence based on the first image and the photographing mode, where the exposure parameter sequence includes at least two exposure parameters sorted in ascending order of photographing time, and the exposure parameters are used to control light admitted to the mobile terminal during photographing; obtaining, by the mobile terminal, at least two frames based on the exposure parameters in the exposure parameter sequence; performing, by the mobile terminal, synthesis processing based on the photographing mode and some or all of the at least two frames, to obtain a target image; and outputting, by the mobile terminal, the target image.

Optionally, before the mobile terminal obtains the previewed first image, the mobile terminal may display, based on a detected camera startup instruction that is entered by the user, a preview of an image that is obtained in real time by a camera to a user by using a display interface. Correspondingly, the user may start the camera of the mobile terminal, and preview, by using the display interface of the mobile terminal, the image that is obtained in real time by the camera.

It should be noted that the first image may be understood as an image that is directly captured when the camera of the mobile terminal starts, or may be understood as a $1^{st}$ photographed image after the user presses a shutter. This is not limited in this embodiment of this application.

Optionally, the mobile terminal may obtain the previewed first image based on a trigger event or a preset second duration. This is not limited in this embodiment of this application.

It should be understood that, in this embodiment of this application, the preset second duration may be understood as a preset duration.

In a possible implementation, the mobile terminal may obtain a current previewed image according to a detected photographing instruction entered by the user, and determine the current previewed image as the first image.

For example, the mobile terminal may obtain the current previewed image when detecting an operation of clicking, by the user, a position of a shutter (photographing) button.

In another possible implementation, the mobile terminal may obtain a current previewed image at an end time point of the preset second duration, and determine the current previewed image as the first image.

For example, the mobile terminal may start a timer after starting a photographing function. A length of the timer is 5 s. When the timer expires, the mobile terminal obtains the current previewed image.

Optionally, the mobile terminal may determine the photographing mode in a plurality of manners. This is not limited in this embodiment of this application.

In a possible implementation, the mobile terminal may obtain a photographing mode instruction entered by the user. The photographing mode instruction is used to indicate a photographing mode specified by the user.

In another possible implementation, the mobile terminal may automatically determine the photographing mode based on the first image. Specifically, the mobile terminal determines, based on the first image captured by the camera, a photographing status and/or a photographing scene for current photographing.

Optionally, the mobile terminal may determine the photographing status in a plurality of manners. This is not limited in this embodiment of this application.

In a possible implementation, the mobile terminal may determine the photographing status based on a plurality of pieces of sensor data that are collected within a preset first duration by a sensor. The sensor data is used to indicate an angle between the mobile terminal and a horizontal direction or a direction of gravity.

For example, if an average value (or a maximum value) of the plurality of pieces of sensor data is greater than or equal to a preset first value, the mobile terminal determines that the photographing status is the handheld state; or if the average value (or the maximum value) of the plurality of pieces of sensor data is less than the first value, the mobile terminal determines that the photographing status is the tripod state.

Optionally, the sensor may be a gyro sensor, an angular velocity sensor, an acceleration sensor, or another sensor capable of obtaining the sensor data indicating the angle between the mobile terminal and the horizontal direction or the direction of gravity. This is not limited in this embodiment of this application.

Optionally, the mobile terminal may determine the photographing mode in a plurality of manners. This is not limited in this embodiment of this application.

In a possible implementation, the mobile terminal may determine the photographing scene based on a brightness value of the first image.

Specifically, the mobile terminal may determine the photographing scene based on a quantity of pixels, in the first image, whose brightness values are greater than a preset second value.

For example, if a ratio of the quantity of pixels, in the first image, whose brightness values are greater than the second value to a quantity of all pixels is greater than or equal to a preset ratio value, the mobile terminal determines that the photographing scene is the light source scene; or if the ratio of the quantity of pixels, in the first image, whose brightness values are greater than the second value to the quantity of all pixels is less than the ratio value, the mobile terminal determines that the photographing scene is the dark scene.

Optionally, the mobile terminal may display first prompt information to the user by using the display interface. The first prompt information is used to prompt the user with the photographing mode.

The following describes how the mobile terminal determines the exposure parameter sequence based on the first image and the photographing mode in different photographing modes.

It should be understood that the following embodiments are described merely by using an example in which the exposure parameters include an exposure duration and light sensitivity.

It should be noted that the exposure parameters may further include another parameter value, such as an aperture value. This is not limited in this embodiment of this application.

Photographing Mode 1: Tripod and Light Source Mode

If the photographing scene is the light source scene, the mobile terminal determines, based on a pixel mean of a first region in the first image, a pixel mean of a second region in the first image, and an exposure parameter of the first image, a first exposure parameter and a second exposure parameter that are included in the exposure reference sequence.

The first region includes at least two pixels whose pixel values are the largest in the first image, and the second region includes at least two pixels whose pixel values are the smallest in the first image. A pixel mean of a region corresponding to the first region in an frame that is obtained by using the first exposure parameter is equal to a preset first pixel threshold, and the pixel mean of the first region is greater than or equal to the first pixel threshold. A pixel mean of a region corresponding to the second region in an frame that is obtained by using the second exposure parameter is equal to a preset second pixel threshold, and the pixel mean of the second region is less than or equal to the second pixel threshold. The first pixel threshold is greater than the second pixel threshold. A photographing time corresponding to the first exposure parameter is earlier than a photographing time corresponding to the second exposure parameter.

If the photographing status is the tripod state, the mobile terminal determines that light sensitivity included in the exposure parameters in the exposure sequence is less than or equal to preset first light sensitivity.

It should be noted that, in this embodiment of this application, the pixel mean of the first region (or the second region) may be understood as a ratio of a sum of pixel values of pixels in the first region (or the second region) to a quantity of the pixels. In a possible alternative manner, the pixel mean of the first region (or the second region) may be replaced with the sum of the pixel values of the pixels in the first region (or the second region). This is not limited in this embodiment of this application.

It should be further noted that, if the pixel mean of the first region is greater than or equal to the first pixel threshold, the first region is an overexposure region, and brightness of the first region needs to be decreased; and likewise, if the pixel mean of the second region is less than or equal to the second pixel threshold, it indicates that the second region is an underexposure region, and brightness of the second region needs to be increased.

In the light source scene, a distribution range of brightness of pixels in an image is relatively large, and overexposure or underexposure may occur. Therefore, the mobile terminal may decrease brightness of an overexposure region (the first region) based on an frame that is obtained by using the first exposure parameter, and increase brightness of an underexposure region (the second region) based on an frame that is obtained by using the second exposure parameter, to obtain an image with a high dynamic range through synthesis, so that a supposed-to-be-bright region in the image is bright, a supposed-to-be-dark region in the image is dark, and the image includes more details.

It should be understood that pixel values of an image are 0 to 255, totaling 256 values. A larger value indicates higher brightness. 0 indicates an all-black darkest region, 255 indicates an all-white color of highest brightness, and numbers between 0 and 255 indicate gray colors of different brightness.

For example, assuming that an exposure duration of the first image is 1 s, light sensitivity of the first image is 100, and the first image includes six pixels whose pixel values are 5, 5, 60, 80, 250, and 250 respectively, the first region includes two pixels whose pixel values are the largest, that is, the pixel mean of the first region is 250; and the second region includes two pixels whose pixel values are the smallest, that is, the pixel mean of the second region is 5.

It should be understood that, when an exposure parameter includes an exposure duration and light sensitivity, admitted light corresponding to the exposure parameter may be understood as a product of the exposure duration and the light sensitivity.

Assuming that the first pixel threshold is 200, because the pixel mean of the first region is 250, and admitted light corresponding to the exposure parameter of the first image is 100, it can be learned that admitted light corresponding to the first exposure parameter is 200×100/250=80.

Assuming that the second pixel threshold is 30, because the pixel mean of the second region is 5, and admitted light corresponding to the exposure parameter of the first image is 100, it can be learned that admitted light corresponding to the second exposure parameter is 30×100/5=600.

When admitted light is the same, an image with lower light sensitivity has a smaller image noise and a better photographing effect. The mobile terminal is relatively stable in the tripod state. Therefore, in the tripod state, the mobile terminal sets light sensitivity in an exposure parameter to a value less than or equal to preset light sensitivity.

In other words, in the tripod state, the mobile terminal obtains an image based on relatively lower light sensitivity and a relatively long exposure duration, to improve a photographing effect of the image.

In a possible implementation, exposure durations included in the exposure parameters in the exposure parameter sequence successively increase, or light sensitivity included in the exposure parameters in the exposure parameter sequence successively increases.

For example, assuming that the preset light sensitivity is 200, an exposure duration in the first exposure parameter may be 0.5 s, light sensitivity in the first exposure parameter may be 160, an exposure duration in the second exposure parameter may be 3 s, and light sensitivity in the second exposure parameter may be 200.

Optionally, the exposure parameter sequence may further include at least one fourth exposure parameter sorted in ascending order of photographing time. A photographing time corresponding to any one of the at least one fourth exposure parameter is later than the photographing time corresponding to the first exposure parameter but earlier than the photographing time corresponding to the second exposure parameter.

Optionally, admitted light corresponding to the exposure parameters in the exposure parameter sequence may successively increase in ascending order of photographing time. To be specific, in the exposure sequence, the admitted light corresponding to the first exposure parameter is the smallest, and the admitted light corresponding to the second exposure parameter is the largest. The at least one fourth exposure parameter may be set between the first exposure parameter and the second exposure parameter, so that the admitted light corresponding to the exposure parameters in the exposure sequence successively increases in ascending order of photographing time, to avoid impact on an frame synthesis effect arising from a relatively large difference between two consecutive frames in a subsequent synthesis processing procedure.

Optionally, a difference between admitted light corresponding to any two exposure parameters in the exposure sequence may be equal to or not equal to a difference between admitted light corresponding to any other two exposure parameters. This is not limited in this embodiment of this application.

For example, assuming that one fourth exposure parameter is included between the first exposure parameter and the second exposure parameter, the exposure duration in the first exposure parameter is 0.5 s, the light sensitivity in the first exposure parameter is 160, the exposure duration in the second exposure parameter is 3 s, and the light sensitivity in the second exposure parameter is 200, an exposure duration in the fourth exposure parameter may be set to 1 s, and light sensitivity in the fourth exposure parameter may be set to 180.

For another example, assuming that two fourth exposure parameters are included between the first exposure parameter and the second exposure parameter, the exposure duration in the first exposure parameter is 0.5 s, the light sensitivity in the first exposure parameter is 160, the exposure duration in the second exposure parameter is 3 s, and the light sensitivity in the second exposure parameter is 200, an exposure duration in a $1^{st}$ fourth exposure parameter may be set to 1 s, and light sensitivity in the $1^{st}$ fourth exposure parameter may be set to 180; and an exposure duration in a $2^{nd}$ fourth exposure parameter may be set to 2 s, and light sensitivity in the $2^{nd}$ fourth exposure parameter may be set to 180.

Optionally, if a pixel value of a region corresponding to the second region in an frame that is obtained by using a largest exposure parameter of the mobile terminal is still less than the second pixel threshold, that is, brightness of an underexposure region is still undesirable, in this case, the mobile terminal may add at least one second exposure parameter (for example, second exposure parameters indicated by slashed shadows in FIG. 6) behind the second exposure parameter, to increase the brightness of the underexposure region.

According to the photographing method provided in this embodiment of this application, in the light source scene, frames of a same photographed object at different exposure levels are obtained by setting different exposure parameters. The first exposure parameter is used to restore image details of a bright region in an frame, and the second exposure parameter is used to restore image details of a dark region in an frame. The frames obtained by using the different exposure parameters are synthesized. In this way, both global details and brightness of a final image are balanced, to improve a dynamic range of the image, thereby improving a photographing effect of the image. In the tripod state, when admitted light is the same, an image noise can be further reduced by setting a relatively long exposure duration and relatively low light sensitivity, so as to improve a photographing effect of an image.

Photographing Mode 2: Handheld and Light Source Mode

If the photographing scene is the light source scene, the mobile terminal determines, based on a pixel mean of a first region in the first image, a pixel mean of a second region in the first image, and an exposure parameter of the first image, a first exposure parameter and a second exposure parameter that are included in the exposure reference sequence.

The first region includes at least two pixels whose pixel values are the largest in the first image, and the second region includes at least two pixels whose pixel values are the smallest in the first image. A pixel mean of a region corresponding to the first region in an frame that is obtained by using the first exposure parameter is equal to a preset first pixel threshold, and the pixel mean of the first region is greater than or equal to the first pixel threshold. A pixel mean of a region corresponding to the second region in an frame that is obtained by using the second exposure parameter is equal to a preset second pixel threshold, and the pixel mean of the second region is less than or equal to the second pixel threshold. The first pixel threshold is greater than the second pixel threshold. A photographing time corresponding to the first exposure parameter is earlier than a photographing time corresponding to the second exposure parameter.

If the photographing status is the handheld state, the mobile terminal determines that the exposure reference sequence includes a reference exposure parameter, and an exposure duration included in the exposure parameters in the exposure sequence is less than or equal to a preset first exposure duration. The reference exposure parameter is an exposure parameter that has the earliest photographing time in the exposure parameter sequence, and admitted light corresponding to the reference exposure parameter is greater than admitted light corresponding to the first exposure parameter but less than admitted light corresponding to the second exposure parameter.

It should be noted that, in this embodiment of this application, the pixel mean of the first region (or the second region) may be understood as a ratio of a sum of pixel values of pixels in the first region (or the second region) to a quantity of the pixels. In a possible alternative manner, the pixel mean of the first region (or the second region) may be replaced with the sum of the pixel values of the pixels in the first region (or the second region). This is not limited in this embodiment of this application.

It should be further noted that, if the pixel mean of the first region is greater than or equal to the preset first pixel threshold, it indicates that the first region is an overexposure region, and brightness of the first region needs to be decreased; and likewise, if the pixel mean of the second region is less than or equal to the preset second pixel threshold, it indicates that the second region is an underexposure region, and brightness of the second region needs to be increased.

For example, assuming that an exposure duration of the first image is 1 s, light sensitivity of the first image is 100, and the first image includes six pixels whose pixel values are 5, 5, 60, 80, 250, and 250 respectively, as shown in FIG. 5, the first region includes two pixels whose pixel values are the largest, that is, the pixel mean of the first region is 250; and the second region includes two pixels whose pixel values are the smallest, that is, the pixel mean of the second region is 5.

It should be understood that, when an exposure parameter includes an exposure duration and light sensitivity, admitted light corresponding to the exposure parameter may be understood as a product of the exposure duration and the light sensitivity.

Assuming that the preset first pixel threshold is 200, because the pixel mean of the first region is 250, and admitted light corresponding to the exposure parameter of the first image is 100, it can be learned that admitted light corresponding to the first exposure parameter is 200×100/250=80.

Assuming that the preset second pixel threshold is 30, because the pixel mean of the second region is 5, and admitted light corresponding to the exposure parameter of the first image is 100, it can be learned that admitted light corresponding to the second exposure parameter is 30×100/5=600.

Because shaking is likely to occur in the handheld mode, the mobile terminal sets an exposure duration of an exposure parameter to a value less than or equal to the preset exposure duration.

In other words, in the handheld state, the mobile terminal obtains an image based on a relatively short exposure duration and relatively high light sensitivity, to improve a photographing effect of the image.

In a possible implementation, exposure durations included in the exposure parameters in the exposure parameter sequence successively increase, and/or light sensitivity included in the exposure parameters in the exposure parameter sequence successively increases.

For example, assuming that the preset exposure duration is 1 s, an exposure duration in the first exposure parameter may be 0.2 s, light sensitivity in the first exposure parameter may be 400, an exposure duration in the second exposure parameter may be 0.5 s, and light sensitivity in the second exposure parameter may be 1200.

For another example, assuming that an exposure duration in the first exposure parameter is 0.2 s, light sensitivity in the first exposure parameter is 400, an exposure duration in the second exposure parameter is 0.5 s, and light sensitivity in the second exposure parameter is 1200, the reference exposure parameter may be set in front of the first exposure parameter. For example, an exposure duration in the reference exposure parameter may be 0.3 s, and light sensitivity in the reference exposure parameter may be 800.

Optionally, the exposure parameter sequence may further include at least one fourth exposure parameter sorted in ascending order of photographing time. A photographing time corresponding to any one of the at least one fourth exposure parameter is later than the photographing time corresponding to the first exposure parameter but earlier than the photographing time corresponding to the second exposure parameter.

Optionally, admitted light corresponding to the exposure parameters in the exposure parameter sequence may successively increase in ascending order of photographing time. To be specific, in the exposure sequence, the admitted light corresponding to the first exposure parameter is the smallest, and the admitted light corresponding to the second exposure parameter is the largest. The at least one fourth exposure parameter may be set between the first exposure parameter and the second exposure parameter, so that the admitted light corresponding to the exposure parameters in the exposure sequence successively increases in ascending order of photographing time, to avoid impact on an image synthesis effect arising from a relatively large difference between two consecutive frames in a subsequent synthesis processing procedure.

Optionally, if a pixel mean of a region corresponding to the second region in an image that is obtained by using a largest exposure parameter of the mobile terminal is still less than the preset second pixel threshold, that is, brightness of an underexposure region is still undesirable, in this case, the mobile terminal may add at least one second exposure parameter (for example, second exposure parameters indicated by slashed shadows in FIG. 7) behind the second exposure parameter, to increase the brightness of the underexposure region.

According to the photographing method provided in this embodiment of this application, in the light source scene, changes in brightness of pixels in an image are relatively large, and overexposure or underexposure may occur. Therefore, the mobile terminal may decrease brightness of an overexposure region based on an frame that is obtained by using the first exposure parameter, and increase brightness of an underexposure region based on an frame that is obtained by using the second exposure parameter, to obtain an image with a high dynamic range through synthesis, so that a supposed-to-be-bright region in the image is bright, a supposed-to-be-dark region in the image is dark, and the image includes more details.

In addition, in the handheld mode, the mobile terminal is not sufficiently stable and is likely to shake. Consequently, a photographed image may be blurred due to shaking, and a plurality of consecutive photographed frames cannot be aligned due to shaking. Therefore, an exposure duration needs to be set to a smallest possible value, to avoid a blurred image due to shaking. In addition, a reference exposure parameter needs to be set in the most front of the exposure sequence, and an image that is obtained by using the reference exposure parameter is used to align subsequently photographed frames.

Optionally, a quantity of exposure parameters that are included in the exposure parameter sequence in the tripod state may be greater than a quantity of exposure parameters that are included in the exposure parameter sequence in the handheld state.

Photographing Mode 3: Tripod and Dark Mode

If the photographing scene is the dark scene, the mobile terminal determines, based on a pixel mean of the first image and an exposure parameter of the first image, a plurality of third exposure parameters included in the exposure reference sequence.

A pixel mean of an frame that is obtained by using the third exposure parameters is equal to a preset third pixel threshold, and the pixel mean of the first image is less than or equal to the preset pixel threshold.

If the photographing status is the tripod state, the mobile terminal determines that light sensitivity included in the exposure parameters in the exposure sequence is less than or equal to preset light sensitivity.

It should be noted that, in this embodiment of this application, the pixel mean of the first image may be understood as a ratio of a sum of pixel values of pixels in the first image to a quantity of the pixels. In a possible alternative manner, the pixel mean of the first image may be replaced with the sum of the pixel values of the pixels in the first image. This is not limited in this embodiment of this application.

It should be further noted that, if the pixel mean of the first image is less than or equal to the preset third pixel threshold, it indicates that the first image is an underexposed image, and brightness of the first image needs to be increased For example, assuming that an exposure duration of the first image is 1 s, light sensitivity of the first image is 100, and the first image includes six pixels whose pixel values are 5, 5, 60, 80, 250, and 250 respectively, as shown in FIG. 5, the pixel mean of the first image is 108.

It should be understood that, when an exposure parameter includes an exposure duration and light sensitivity, admitted light corresponding to the exposure parameter may be understood as a product of the exposure duration and the light sensitivity.

Assuming that the third pixel threshold is 128, because the pixel mean of the first image is 108, and admitted light corresponding to the exposure parameter of the first image is 100, it can be learned that admitted light corresponding to the third exposure parameter is 200×100/250=118.

When admitted light is the same, an image with lower light sensitivity has a smaller image noise and a better photographing effect. The mobile terminal is relatively stable in the tripod mode. Therefore, in the tripod mode, the mobile terminal sets light sensitivity in an exposure parameter to a value less than preset first light sensitivity, and obtains an image based on relatively lower light sensitivity and a relatively long exposure duration.

In conclusion, assuming that the preset first light sensitivity is 100, an exposure duration in the third exposure parameter may be, for example, 1.2 s, and light sensitivity in the third exposure parameter may be, for example, 100.

According to the photographing method provided in this embodiment of this application, in the dark scene, light is relatively weak, image brightness is relatively poor, and overexposure does not occur. Therefore, the mobile terminal may increase brightness of an underexposure region based on an frame that is obtained by using the plurality of third exposure parameters, to increase image brightness, so that an image includes more details, thereby improving a photographing effect of the image. In the tripod state, when admitted light is the same, an image noise can be further reduced by setting a relatively long exposure duration and relatively low light sensitivity, so as to improve a photographing effect of an image.

Photographing Mode 4: Handheld and Dark Mode

If the photographing scene is the dark scene, the mobile terminal determines, based on a pixel mean of the first image and an exposure parameter of the first image, a plurality of third exposure parameters included in the exposure reference sequence.

A pixel mean of an frame that is obtained by using the third exposure parameters is equal to a preset third pixel threshold, and the pixel mean of the first image is less than or equal to the third pixel threshold.

If the photographing status is the handheld state, the mobile terminal determines that the exposure reference sequence includes a reference exposure parameter, and an exposure duration included in the exposure parameters in the exposure sequence is less than or equal to a preset exposure duration. The reference exposure parameter is an exposure parameter that has the earliest photographing time in the exposure parameter sequence, and admitted light corresponding to the reference exposure parameter is equal to admitted light corresponding to the third exposure parameter.

According to the photographing method provided in this embodiment of this application, in the dark scene, light is relatively weak, image brightness is relatively poor, and overexposure does not occur. Therefore, the mobile terminal may increase brightness of an underexposure region based on an frame that is obtained by using the plurality of third exposure parameters, to increase image brightness, so that an image includes more details, thereby improving a photographing effect of the image.

In addition, in the handheld mode, the mobile terminal is not sufficiently stable and is likely to shake. Consequently, a photographed image may be blurred due to shaking, and a plurality of consecutive photographed frames cannot be aligned due to shaking. Therefore, an exposure duration needs to be set to a smallest possible value, to avoid a blurred image due to shaking. In addition, a reference exposure parameter needs to be set in the most front of the exposure sequence, and an image that is obtained by using the reference exposure parameter is used to align subsequently photographed frames.

The following describes how the mobile terminal performs synthesis processing based on some or all of the at least two frames in different photographing modes, to obtain the target image.

Photographing Mode 1: Tripod and Light Source Mode

It should be noted that, assuming that the at least two frames include N frames, and N is an integer greater than 1 the synthesis processing includes pixel superposition processing and frame blending processing in photographing mode 1.

Specifically, the mobile terminal performs pixel superposition processing on an $i^{th}$ frame in the N frames and a synthesis processing result of first i−1 frames, to obtain a pixel superposition processing result of first i frames, where a value of i is 2, 3, . . . , or N; the terminal device performs frames blending processing on the $i^{th}$ frame and the pixel superposition processing result of the first i frames, to obtain an $i^{th}$ candidate target image; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be noted that, when the value of i is 2, a synthesis processing result of first one image may be understood as a first candidate target image, or a pixel superposition processing result of first one image, or a $1^{st}$ image.

In a possible implementation, that the mobile terminal performs pixel superposition processing on the $i^{th}$ frame and the synthesis processing result of the first i−1 frames may be understood as that the mobile terminal performs pixel superposition processing on the $i^{th}$ frame and the synthesis processing result of the first i−1 frames based on a preset first weight of the synthesis processing result of the first i−1 frames and a preset second weight of the $i^{th}$ frame. A sum of the preset first weight and the preset second weight is greater than 1 but less than 2.

For example, the preset first weight is equal to 1, and the preset second weight is greater than 0 but less than 1; or both the preset first weight and the preset second weight are greater than 0 but less than 1.

For example, assuming that a pixel value of a $1^{st}$ pixel (a pixel in row 1 and column 1) in a $1^{st}$ frame is 60, the preset first weight is 1, a pixel value of a $1^{st}$ pixel in a $2^{nd}$ frame is 80, and the preset second weight is 0.4, a pixel value of a $1^{st}$ pixel in a pixel superposition processing result, obtained after pixel superposition processing is performed on the $1^{st}$ frame and the $2^{nd}$ frame, of first two frames is 60×1+80×0.4=92.

In a possible implementation, the mobile terminal determines, according to a preset first rule, a weight of a pixel in the pixel superposition result of the first i frames and a weight of a pixel in the $i^{th}$ frame, where the preset first rule includes: A pixel closer to a brightness center (for example, a pixel whose pixel value is 128) has a larger weight, and a pixel farther away from the brightness center has a smaller weight; and performs frame blending processing on the $i^{th}$ frame and the pixel superposition result of the first i frames based on the weight of the pixel in the pixel superposition result of the first i frames and the weight of the pixel in the $i^{th}$ frame, to obtain the $i^{th}$ candidate target image.

For another example, assuming that a pixel value of a $1^{st}$ pixel (a pixel in row 1 and column 1) in a pixel superposition processing result of first two frames is 92, a weight, obtained according to the preset first rule, of the $1^{st}$ pixel in the pixel superposition processing result of the first two frames is 0.6, a pixel value of a $1^{st}$ pixel in a $2^{nd}$ frame is 80, and a weight, obtained according to the preset first rule, of the $1^{st}$ pixel in the $2^{nd}$ frame is 0.4, when frame blending processing is performed on the $2^{nd}$ frame and the pixel superposition processing result of the first two frames, the weights of the two frames are first normalized (0.6:0.4=3/5:2/5), and then superposition is performed, that is, a pixel value of a $1^{st}$ pixel in the $2^{nd}$ candidate target frame is 3/5×92+2/5×80=87.2.

In other words, the mobile terminal first performs pixel superposition processing on the $i^{th}$ frame in the N frames and the synthesis processing result of the first i−1 frames, so as to improve image brightness; and then performs frame blending processing on the $i^{th}$ frame and the superposition processing result of the first i frames, so that all regions in an entire image approach a brightness center. Finally, a dynamic range of an image that is obtained after synthesis is improved, and a photographing effect of the image is improved.

It should be noted that, in the foregoing examples, a pixel superposition processing procedure and an frame blending processing procedure are described by using pixels at corresponding locations in the $1^{st}$ frame and the $2^{nd}$ frame. A processing procedure of pixels at corresponding locations in two frames is similar to the foregoing procedures. To avoid repetition, details are not described herein again.

Optionally, if the mobile terminal does not detect, within the preset first duration, a synthesis processing end instruction that is entered based on the second prompt information by the user, the mobile terminal performs synthesis processing on an $(i+1)^{th}$ frame in the N frames and a synthesis result of the first i frames, to obtain an $(i+1)^{th}$ candidate target image; and the mobile terminal displays the $(i+1)^{th}$ candidate target image and the second prompt information to the user by using the display interface.

Optionally, if the mobile terminal does not receive, within the preset first duration after displaying an $N^{th}$ candidate target image to the user by using the display interface, a synthesis processing end instruction that is entered by the user, the mobile terminal determines the $N^{th}$ candidate target image as the target image.

In other words, in a procedure of successively performing, by the mobile terminal, synthesis processing on the at least two frames, each time synthesis is performed, a synthesis processing result of the synthesis is displayed to the user by using the display interface, and the user is prompted to output or not to output the synthesis result of the synthesis as the target image; and if a synthesis processing end instruction from the user is detected within the preset first duration after the user is prompted, the synthesis result obtained this time is output as the target image; otherwise, synthesis continues to be performed on a next image, until last synthesis is completed.

Optionally, before the mobile terminal performs synthesis processing on the $1^{st}$ frame and the $2^{nd}$ frame, the mobile terminal may display the $1^{st}$ frame to the user by using the display interface; and if the mobile terminal detects, within the preset first duration, a synthesis processing end instruction that is entered based on the second prompt information by the user, the mobile terminal stops the synthesis processing, and determines the $1^{st}$ frame as the target image; or if the mobile terminal does not detect a synthesis processing end instruction within the preset first duration, the mobile terminal performs synthesis processing on the $1^{st}$ frame and the $2^{nd}$ frame.

Photographing Mode 2: Handheld and Light Source Mode

It should be noted that, assuming that the at least two frames include N frames, and N is an integer greater than 1, the synthesis processing includes frame registration processing, pixel superposition processing, and frame blending processing in photographing mode 1.

Specifically, the mobile terminal performs frame registration processing on an $i^{th}$ frame in the N frames based on an frame that is obtained by using the reference exposure parameter, to obtain an $i^{th}$ frame registration processing result; the terminal device performs pixel superposition processing on the $i^{th}$ frame registration processing result and a synthesis processing result of first i−1 frames, to obtain an $i^{th}$ pixel superposition processing result, where a value of i is 2, 3, . . . , or N; the terminal device performs frame blending processing on the $i^{th}$ pixel superposition processing result and the $i^{th}$ frame, to obtain an $i^{th}$ candidate target image; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be noted that a difference between photographing mode 2 and photographing mode 1 lies in the following: In photographing mode 2, the mobile terminal is in the handheld state; therefore, before each frame is synthesized, frame registration processing needs to be performed on the frame and a reference frame that is obtained by using a reference exposure parameter, to avoid inter-frame jitter caused by the handheld state, that is, all frames except the reference frame need to be aligned with the reference frame.

In addition, there may be an unaligned edge region after the frame registration processing. An frame registration processing result may be cropped or magnified, to remove the unaligned edge region.

Specifically, frame registration may be performed by using an frame registration method in the prior art. This is not limited in this embodiment of this application.

Optionally, because shaking and blurring may occur in the handheld state, each frame may be sharpened in a synthesis processing procedure, to improve image definition.

It should be understood that a pixel superposition processing procedure and an frame blending processing procedure in photographing mode 2 are the same as the pixel superposition processing procedure in photographing mode 1. For detailed processing, refer to photographing mode 1. To avoid repetition, details are not described herein again.

Photographing Mode 3: Tripod and Dark Mode

It should be noted that, assuming that the at least two frames include N frames, and N is an integer greater than 1, the synthesis processing includes pixel superposition processing in photographing mode 1.

Specifically, the mobile terminal performs pixel superposition processing on an $i^{th}$ frame in the N frames and a synthesis processing result of first i−1 frames, to obtain an $i^{th}$ candidate target image, where a value of i is 2, 3, . . . , or N; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be understood that a pixel superposition processing procedure in photographing mode 3 is the same as the pixel superposition processing procedure in photographing mode 1. For detailed processing, refer to photographing mode 1. To avoid repetition, details are not described herein again.

Photographing Mode 4: Handheld and Dark Mode

It should be noted that, assuming that the at least two frames include N frames, and N is an integer greater than 1, the synthesis processing includes frame registration processing and pixel superposition processing in photographing mode 1.

Specifically, the terminal device performs frame registration processing on an $i^{th}$ frame in the N frames based on an frame that is obtained by using the reference exposure parameter, to obtain an $i^{th}$ frame registration processing result; the mobile terminal performs pixel superposition processing on the $i^{th}$ frame registration processing result and a synthesis processing result of first i−1 frames, to obtain an $i^{th}$ candidate target image, where a value of i is 2, 3, . . . , or N; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be understood that an frame registration processing procedure and a pixel superposition processing procedure in photographing mode 3 are the same as the pixel superposition processing procedure in photographing mode 1. For detailed processing, refer to photographing mode 1. To avoid repetition, details are not described herein again.

Optionally, in a photographing procedure of S210 to S250, the mobile terminal may further display, to the user by using the display interface, a photographing countdown shown in FIG. 10. The photographing timer is used to indicate a remaining time for processing an image in the photographing procedure to the user.

In a possible implementation, before S240, the mobile terminal may display the at least two images to the user by using the display interface, and detect an image selection instruction that is entered based on the at least two images by the user, where the image selection instruction is used to indicate a plurality of images that are selected by the user from the at least two images. Correspondingly, in S240, the mobile terminal may perform synthesis processing on the plurality of frames based on the detected image selection instruction, to obtain the target image.

Optionally, that the mobile terminal outputs the target image may be understood as that the mobile terminal may use the target image as an image to be finally stored into a gallery after current photographing. In other words, the mobile terminal may store the target image into a memory.

According to a second aspect, this application provides a photographing apparatus, including units configured to perform steps of the photographing method according to the first aspect and the implementations of the first aspect.

According to a third aspect, this application provides a computer program product, where the computer program product includes a computer program (which may also be referred to as code or an instruction), and when the computer program runs, a computer is enabled to perform the photographing method according to the first aspect and the implementations of the first aspect.

According to a fourth aspect, this application provides a computer-readable medium, where the computer-readable medium stores a computer program (which may also be referred to as code or an instruction), and when the computer program runs on a computer, the computer is enabled to perform the photographing method according to the first aspect and the implementations of the first aspect.

According to a fifth aspect, this application provides a chip system, including a memory and a processor, where the memory is configured to store a computer program, and the processor is configured to invoke the computer program from the memory and execute the computer program, so that a device on which the chip system is installed performs the photographing method according to the first aspect and the implementations of the first aspect.

According to a sixth aspect, this application provides a mobile terminal, where the mobile terminal includes a processor, a memory, and a computer program that is stored in the memory and can run on the processor, and when the computer program is executed by the processor, the photographing method according to the first aspect and the implementations of the first aspect is implemented.

The mobile terminal may obtain sensor data by using a sensor, and present a display interface to a user by using a display screen.

DESCRIPTION OF EMBODIMENTS

The following describes technical solutions of this application with reference to the accompanying drawings.

A photographing method in this application may be applied to a mobile terminal. The mobile terminal may also be referred to as a terminal device, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The mobile terminal may be a station (ST) in a WLAN; or may be a cellular phone, a cordless phone, a Session Initiation Protocol (SIP) phone, a wireless local loop (WLL) station, a personal digital assistant (PDA) device, a handheld device having a wireless communication function, a computing device or another processing device connected to a wireless modem, an in-vehicle device, an Internet of Vehicles terminal, a computer, a laptop computer, a handheld communications device, a handheld computing device, a satellite radio device, a wireless modem card, a television set top box (STB), customer premises equipment (CPE), and/or another device configured to perform communication in a wireless system, or a mobile terminal in a next-generation communications system such as a 5G network, or a mobile terminal in a future evolved public land mobile network (PLMN), or the like.

By way of example but not limitation, in the embodiments of this application, the mobile terminal may alternatively be a wearable device. The wearable device may also be referred to as a wearable intelligent device. The wearable intelligent device is a collective name of wearable devices, such as glasses, gloves, watches, clothes, and shoes, obtained by performing intelligent design and development on daily wearables by using a wearable technology. The wearable device is a portable device that is directly put on a human body or is integrated with a user's clothes or ornaments. The wearable device is not merely a hardware device, but further implements a powerful function through software support, data exchange, and cloud-based interaction. In a broad sense, the wearable intelligent device includes a device that provides a complete function, has a large size, and can implement all or some functions without relying on a smartphone, for example, a smartwatch or smart glasses; and includes a device that focuses only on a specific type of application and needs to be used in combination with another device such as a smartphone, for example, various smart bands and smart jewelry used for vital sign monitoring.

Figure 3:
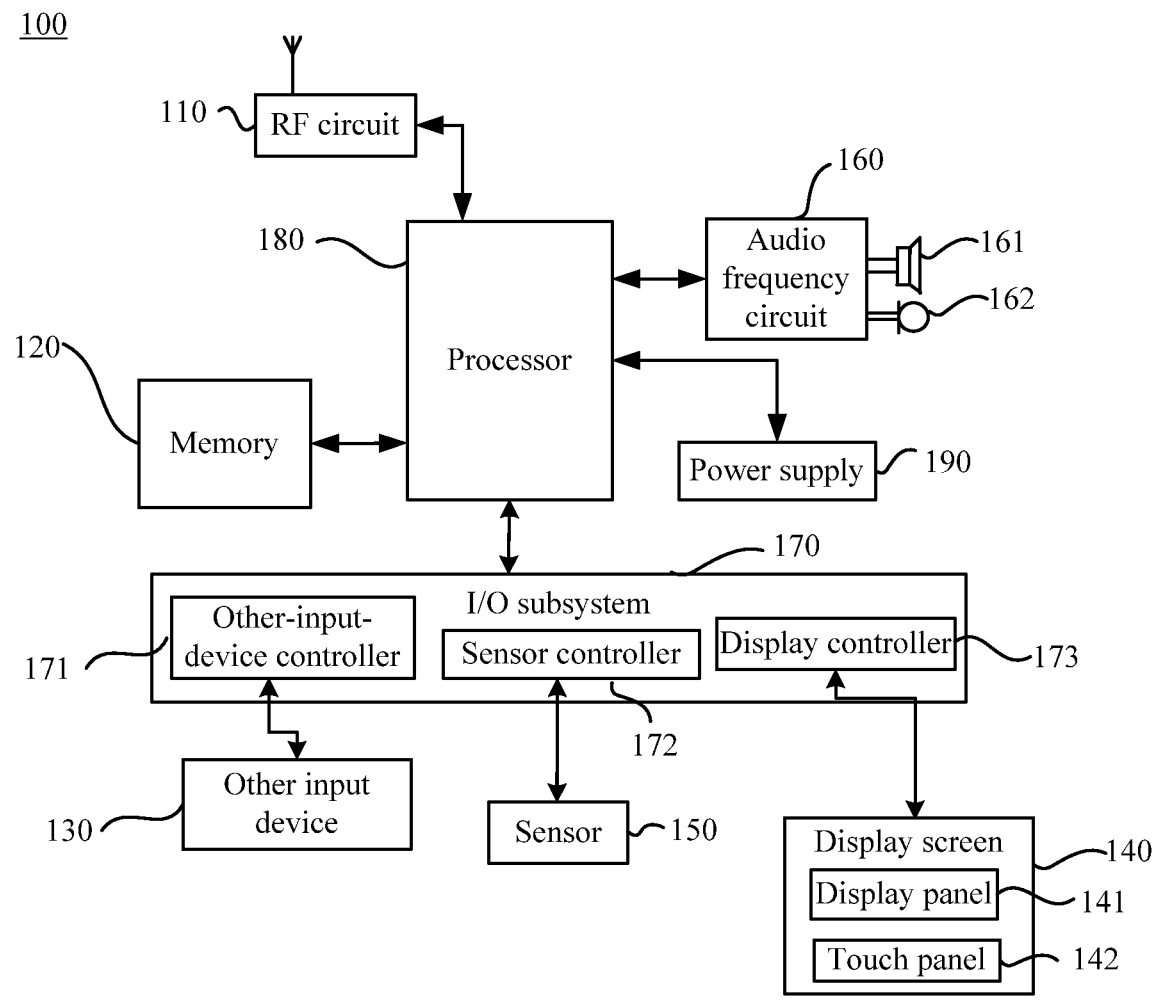
FIG. 3 is a schematic diagram of an example of a mobile terminal to which a photographing method according to an embodiment of this application is applicable.

FIG. 3 shows an example of an architecture of a mobile terminal according to an embodiment of this application. As shown in FIG. 3, the mobile terminal 100 may include the following components.

A. RF Circuit 110

The RF circuit 110 may be configured to receive or send a signal in an information receiving/sending process or a call process, and in particular, receive downlink information from a base station and send the downlink information to a processor 180 for processing; and send designed uplink data to the base station. Usually, the RF circuit includes but is not limited to an antenna, at least one amplifier, a transceiver, a coupler, an LNA (low noise amplifier), a duplexer, and the like. In addition, the RF circuit 110 may further communicate with a network and another device through radio communication. Any communications standard or protocol may be used for the radio communication, including but not limited to a wireless local area network (WLAN), a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5th Generation (5G) system, a new radio (NR) system, and the like.

B. Memory 120

The memory 120 may be configured to store a software program and a module. The processor 180 runs the software program and the module that are stored in the memory 120, to perform various function applications and data processing of the mobile terminal 100. The memory 120 may mainly include a program storage area and a data storage area. The program storage area may store an operating system, an application program required by at least one function (such as a sound play function or an image play function), and the like. The data storage area may store data (such as audio data and a phone book) that is created based on use of the mobile terminal 100, and the like. In addition, the memory 120 may include a high-speed random access memory, and may further include a nonvolatile memory, for example, at least one magnetic disk storage device, a flash memory device, or another volatile solid-state storage device.

C. Other Input Device 130

The other input device 130 may be configured to receive entered digital or character information, and generate key signal inputs that are related to user settings and function control of the mobile terminal 100. Specifically, the other input device 130 may include but is not limited to one or more of a physical keyboard, a function key (such as a volume control key or an on/off key), a trackball, a mouse, a joystick, an optical mouse (where the optical mouse is a touch-sensitive surface that does not display a visual output, or is an extension of a touch-sensitive surface formed by a touchscreen), and the like. The other input device 130 is connected to an other-input-device controller 171 of an I/O subsystem 170, and performs signal exchange with the processor 180 under control of the other-input-device controller 171.

D. Display Screen 140

Figure 1:
FIG. 1 is a blurred image resulting from shaking according to an embodiment of this application.
Figure 2:
FIG. 2 is an underexposed image according to an embodiment of this application.

The display screen 140 may be configured to display information entered by a user or information provided for a user, and various menus of the mobile terminal 100; and may further receive user inputs. Specifically, the display screen 140 may include a display panel 141 and a touch panel 142. The display panel 141 may be configured in a form of a liquid crystal display (Liquid Crystal Display, LCD), an organic light-emitting diode (Organic Light-Emitting Diode, OLED), or the like. The touch panel 142 is also referred to as a touchscreen, a touch-sensitive screen, or the like; and may collect a touch or non-touch operation of a user on or around the touch panel 142 (for example, an operation performed on or around the touch panel 142 by a user by using any proper object or accessory such as a finger or a stylus, where the operation may also include a motion sensing operation, and the operation includes operation types such as a single-point control operation and a multi-point control operation), and drive a corresponding connection apparatus by using a preset program. Optionally, the touch panel 142 may include two parts: a touch detection apparatus and a touch controller. The touch detection apparatus detects a touch orientation and a gesture of the user, detects a signal arising from the touch operation, and transmits the signal to the touch controller. The touch controller receives touch information from the touch detection apparatus, converts the touch information into information that can be processed by the processor 180, and sends the converted information to the processor 180. In addition, the touch controller can receive a command sent by the processor 180 and then execute the command. In addition, the touch panel 142 may be implemented in a plurality of types such as a resistive type, a capacitive type, an infrared type, and a surface acoustic wave; or the touch panel 142 may be implemented by using any technology to be developed in the future. Further, the touch panel 142 may cover the display panel 141. The user may perform, based on content (where the content includes but is not limited to a soft keyboard, a virtual mouse, a virtual key, an icon, and the like) displayed on the display panel 141, an operation on or around the touch panel 142 covering the display panel 141. After detecting the operation on or around the touch panel 142, the touch panel 142 transmits, by using the I/O subsystem 170, information about the operation to the processor 180 to determine a user input. Then the processor 180 provides, by using the I/O subsystem 170, a corresponding visual output on the display panel 141 based on the user input. In FIG. 1, the touch panel 142 and the display panel 141 are two independent components to implement input and output functions of the mobile terminal 100. However, in some embodiments, the touch panel 142 and the display panel 141 may be integrated, to implement the input and output functions of the mobile terminal 100.

E. Sensor 150

There may be one or more types of sensors 150. For example, the sensors 150 may include light sensors, motion sensors, and other sensors.

Specifically, light sensors may include ambient light sensors and proximity sensors. An ambient light sensor can adjust luminance of the display panel 141 based on intensity of ambient light. When the mobile terminal 100 is moved and gets close to an ear, the proximity sensor can turn off the display panel 141 and/or backlight.

As a motion sensor, an acceleration sensor can detect a value of an acceleration in various directions (usually three axes), and can detect a value and a direction of gravity when the mobile terminal is still. The acceleration sensor may be used for an application (such as screen switching between a portrait mode and a landscape mode, a related game, or magnetometer posture calibration) for recognizing a posture of the mobile terminal, a function (such as a pedometer or a keystroke) related to vibration recognition, and the like.

In addition, the mobile terminal 100 may be further equipped with another sensor, such as a gravity sensor (which may also be referred to as a gravity sensor), a gyroscope, a barometer, a hygrometer, a thermometer, or an infrared sensor. Details are not described herein again.

F. Audio Frequency Circuit 160, Speaker 161, and Microphone 162

An audio interface may be provided between the user and the mobile terminal 100. The audio frequency circuit 160 can transmit, to the speaker 161, a signal that is converted from received audio data. The speaker 161 converts the signal into a sound signal and outputs the sound signal. In addition, the microphone 162 converts a collected sound signal into a signal; and the audio frequency circuit 160 receives the signal, converts the signal into audio data, and then outputs the audio data to the RF circuit 108 for sending to, for example, another mobile terminal, or outputs the audio data to the memory 120 for further processing.

G. I/O Subsystem 170

The I/O subsystem 170 is configured to control external input/output devices, and may include the other-input-device controller 171, a sensor controller 172, and a display controller 173. Optionally, one or more other-input-device controllers 171 receive a signal from the other input device 130, and/or send a signal to the other input device 130. The other input device 130 may include a physical button (such as a push button or a rocker button), a dial pad, a slider switch, a joystick, a click wheel, or an optical mouse (where the optical mouse is a touch-sensitive surface that does not display a visual output, or is an extension of a touch-sensitive surface formed by a touchscreen). It is worth noting that the other-input-device controller 171 may be connected to any one or more of the foregoing devices. The display controller 173 in the I/O subsystem 170 receives a signal from the display screen 140, and/or sends a signal to the display screen 140. After the display screen 140 detects a user input, the display controller 173 converts the detected user input into interaction with a user interface object that is displayed on the display screen 140, so as to implement man-machine interaction. The sensor controller 172 can receive a signal from one or more sensors 150, and/or send a signal to one or more sensors 150.

H. Processor 180

The processor 180 is a control center of the mobile terminal 100, connects various parts of the entire mobile terminal by using various interfaces and lines, and performs various functions and data processing of the mobile terminal 100 by running or executing the software program and/or the module stored in the memory 120 and invoking data stored in the memory 120, so as to perform overall monitoring on the mobile terminal. Optionally, the processor 180 may include one or more processing units. Preferably, the processor 180 may integrate an application processor and a modem processor. The application processor mainly processes an operating system, a user interface, an application program, and the like. The modem processor mainly processes radio communication. It may be understood that alternatively the modem processor may not be integrated in the processor 180.

The mobile terminal 100 further includes a power supply 190 (such as a battery) that supplies power to various components. Preferably, the power supply may be logically connected to the processor 180 by using a power supply management system, so as to implement, by using the power supply management system, functions such as charging management, discharging management, and power consumption management.

Optionally, the mobile terminal 100 may further include a camera.

Optionally, the camera may be disposed in the front or the rear of the mobile terminal 100. This is not limited in this embodiment of this application.

Optionally, the mobile terminal 100 may include one camera, two cameras, three cameras, and the like. This is not limited in this embodiment of this application.

For example, the mobile terminal 100 may include three cameras: one main camera, one wide-angle camera, and one long-focus camera.

Optionally, when the mobile terminal 100 includes a plurality of cameras, the plurality of cameras may all be disposed in the front; or may all be disposed in the rear; or some of the cameras may be disposed in the front, and others may be disposed in the rear. This is not limited in this embodiment of this application.

In addition, although not shown, the mobile terminal 100 may further include a Bluetooth module, and the like. Details are not described herein again.

Figures 4, 5:
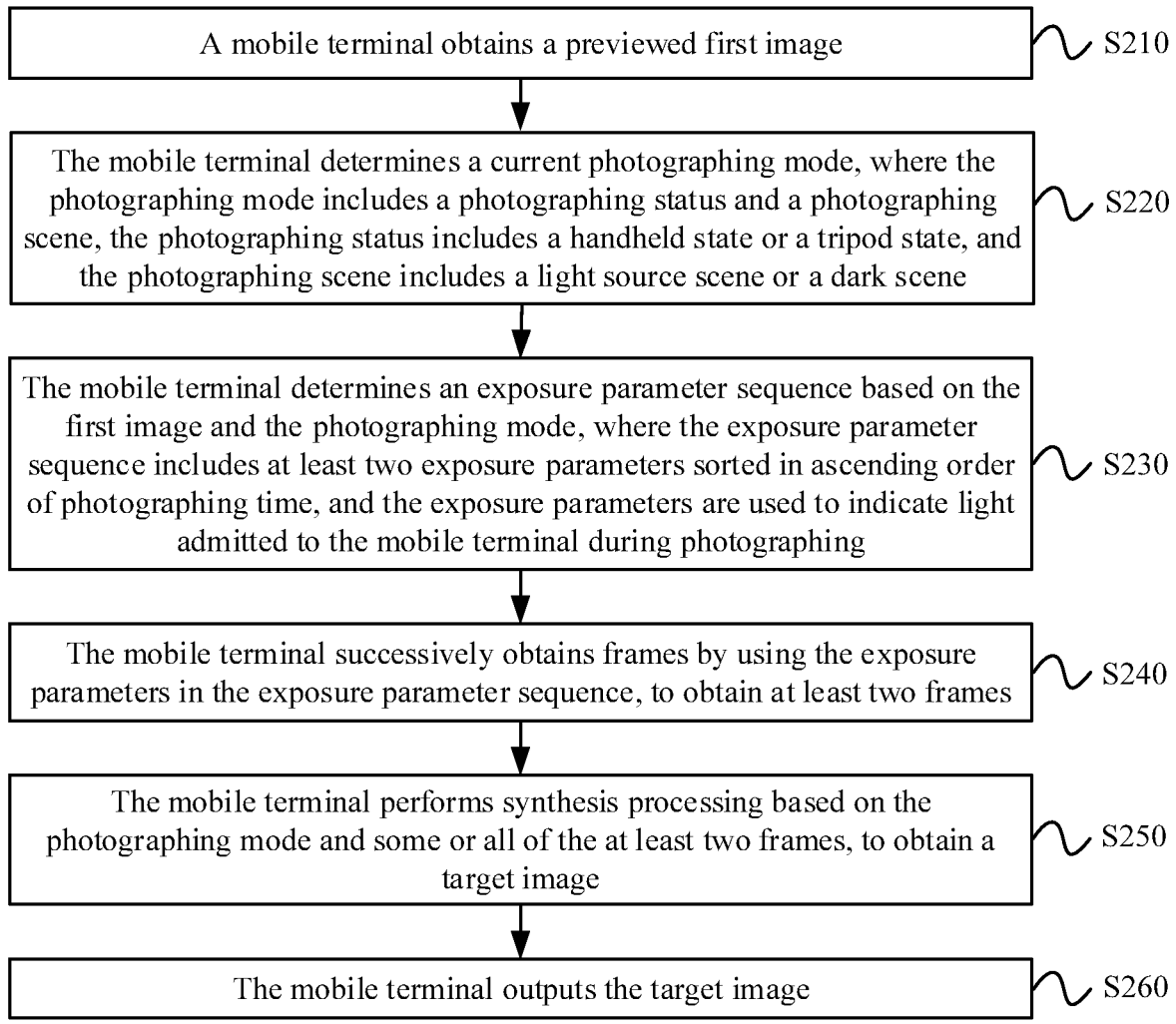
FIG. 4 is a schematic flowchart of a photographing method according to an embodiment of this application.
FIG. 5 is a schematic diagram of pixels in a first image according to an embodiment of this application.

FIG. 4 is a schematic flowchart of a photographing method 200 according to this application. For example, the method 200 may be applied to the foregoing mobile terminal 100.

S210. A mobile terminal obtains a previewed first image.

Optionally, before S210, the mobile terminal may display, based on a detected camera startup instruction that is entered by the user, a preview of an image that is obtained in real time by a camera to a user by using a display interface. Correspondingly, the user may start the camera of the mobile terminal, and preview, by using the display interface of the mobile terminal, the image that is obtained in real time by the camera.

It should be noted that the first image may be understood as an image that is directly captured when the camera of the mobile terminal starts, or may be understood as a $1^{st}$ photographed image after the user presses a shutter. This is not limited in this embodiment of this application.

Optionally, in S210, the mobile terminal may obtain the previewed first image based on a trigger event or a preset second duration. This is not limited in this embodiment of this application.

It should be understood that, in this embodiment of this application, the preset second duration may be understood as a preset duration.

In a possible implementation, the mobile terminal may obtain a current previewed image according to a detected photographing instruction entered by the user, and determine the current previewed image as the first image.

For example, the mobile terminal may obtain the current previewed image when detecting an operation of clicking, by the user, a position of a shutter (photographing) button.

In another possible implementation, the mobile terminal may obtain a current previewed image at an end time point of the preset second duration, and determine the current previewed image as the first image.

For example, the mobile terminal may start a timer after starting a photographing function. A length of the timer is 5 s. When the timer expires, the mobile terminal obtains the current previewed image.

S220. The mobile terminal determines a current photographing mode, where the photographing mode includes a photographing status or a photographing scene, the photographing status includes a handheld state or a tripod state, and the photographing scene includes a light source scene or a dark scene.

Optionally, the mobile terminal may determine the photographing mode in a plurality of manners. This is not limited in this embodiment of this application.

In a possible implementation, the mobile terminal may obtain a photographing mode instruction entered by the user. The photographing mode instruction is used to indicate a photographing mode specified by the user.

In another possible implementation, the mobile terminal may automatically determine the photographing mode based on the first image. Specifically, the mobile terminal determines, based on the first image captured by the camera, a photographing status and/or a photographing scene for current photographing.

Optionally, the mobile terminal may determine the photographing status in a plurality of manners. This is not limited in this embodiment of this application.

In a possible implementation, the mobile terminal may determine the photographing status based on a plurality of pieces of sensor data that are collected within a preset first duration by a sensor. The sensor data is used to indicate an angle between the mobile terminal and a horizontal direction or a direction of gravity.

For example, if an average value (or a maximum value) of the plurality of pieces of sensor data is greater than or equal to a preset first value, the mobile terminal determines that the photographing status is the handheld state; or if the average value (or the maximum value) of the plurality of pieces of sensor data is less than the first value, the mobile terminal determines that the photographing status is the tripod state.

Optionally, the sensor may be a gyro sensor, an angular velocity sensor, an acceleration sensor, or another sensor capable of obtaining the sensor data indicating the angle between the mobile terminal and the horizontal direction or the direction of gravity. This is not limited in this embodiment of this application.

Optionally, the mobile terminal may determine the photographing mode in a plurality of manners. This is not limited in this embodiment of this application.

In a possible implementation, the mobile terminal may determine the photographing scene based on a brightness value of the first image.

Specifically, the mobile terminal may determine the photographing scene based on a quantity of pixels, in the first image, whose brightness values are greater than a preset second value.

For example, if a ratio of the quantity of pixels, in the first image, whose brightness values are greater than the second value to a quantity of all pixels is greater than or equal to a preset ratio value, the mobile terminal determines that the photographing scene is the light source scene; or if the ratio of the quantity of pixels, in the first image, whose brightness values are greater than the second value to the quantity of all pixels is less than the ratio value, the mobile terminal determines that the photographing scene is the dark scene.

Optionally, the mobile terminal may display first prompt information to the user by using the display interface. The first prompt information is used to prompt the user with the photographing mode.

S230. The mobile terminal determines an exposure parameter sequence based on the first image and the photographing mode, where the exposure parameter sequence includes at least two exposure parameters sorted in ascending order of photographing time, and the exposure parameters are used to control light admitted to the mobile terminal during photographing.

The following describes how the mobile terminal determines the exposure parameter sequence based on the first image and the photographing mode in different photographing modes.

It should be understood that the following embodiments are described merely by using an example in which the exposure parameters include an exposure duration and light sensitivity.

It should be noted that the exposure parameters may further include another parameter value, such as an aperture value. This is not limited in this embodiment of this application.

Photographing Mode 1: Tripod and Light Source Mode

If the photographing scene is the light source scene, the mobile terminal determines, based on a pixel mean of a first region in the first image, a pixel mean of a second region in the first image, and an exposure parameter of the first image, a first exposure parameter and a second exposure parameter that are included in the exposure reference sequence.

The first region includes at least two pixels whose pixel values are the largest in the first image, and the second region includes at least two pixels whose pixel values are the smallest in the first image. A pixel mean of a region corresponding to the first region in an frame that is obtained by using the first exposure parameter is equal to a preset first pixel threshold, and the pixel mean of the first region is greater than or equal to the first pixel threshold. A pixel mean of a region corresponding to the second region in an frame that is obtained by using the second exposure parameter is equal to a preset second pixel threshold, and the pixel mean of the second region is less than or equal to the second pixel threshold. The first pixel threshold is greater than the second pixel threshold. A photographing time corresponding to the first exposure parameter is earlier than a photographing time corresponding to the second exposure parameter.

If the photographing status is the tripod state, the mobile terminal determines that light sensitivity included in the exposure parameters in the exposure sequence is less than or equal to preset first light sensitivity.

It should be noted that, in this embodiment of this application, the pixel mean of the first region (or the second region) may be understood as a ratio of a sum of pixel values of pixels in the first region (or the second region) to a quantity of the pixels. In a possible alternative manner, the pixel mean of the first region (or the second region) may be replaced with the sum of the pixel values of the pixels in the first region (or the second region). This is not limited in this embodiment of this application.

It should be further noted that, if the pixel mean of the first region is greater than or equal to the first pixel threshold, it indicates that the first region is an overexposure region, and brightness of the first region needs to be decreased; and likewise, if the pixel mean of the second region is less than or equal to the second pixel threshold, it indicates that the second region is an underexposure region, and brightness of the second region needs to be increased.

In the light source scene, a distribution range of brightness of pixels in an image is relatively large, and overexposure or underexposure may occur. Therefore, the mobile terminal may decrease brightness of an overexposure region (the first region) based on an frame that is obtained by using the first exposure parameter, and increase brightness of an underexposure region (the second region) based on an frame that is obtained by using the second exposure parameter, to obtain an image with a high dynamic range through synthesis, so that a supposed-to-be-bright region in the image is bright, a supposed-to-be-dark region in the image is dark, and the image includes more details.

It should be understood that pixel values of an image are 0 to 255, totaling 256 values. A larger value indicates higher brightness. 0 indicates an all-black darkest region, 255 indicates an all-white color of highest brightness, and numbers between 0 and 255 indicate gray colors of different brightness.

For example, assuming that an exposure duration of the first image is 1 s, light sensitivity of the first image is 100, and the first image includes six pixels whose pixel values are 5, 5, 60, 80, 250, and 250 respectively, as shown in FIG. 5, the first region includes two pixels whose pixel values are the largest, that is, the pixel mean of the first region is 250; and the second region includes two pixels whose pixel values are the smallest, that is, the pixel mean of the second region is 5.

It should be understood that, when an exposure parameter includes an exposure duration and light sensitivity, admitted light corresponding to the exposure parameter may be understood as a product of the exposure duration and the light sensitivity.

Assuming that the first pixel threshold is 200, because the pixel mean of the first region is 250, and admitted light corresponding to the exposure parameter of the first image is 100, it can be learned that admitted light corresponding to the first exposure parameter is 200×100/250=80.

Assuming that the second pixel threshold is 30, because the pixel mean of the second region is 5, and admitted light corresponding to the exposure parameter of the first image is 100, it can be learned that admitted light corresponding to the second exposure parameter is 30×100/5=600.

When admitted light is the same, an image with lower light sensitivity has a smaller image noise and a better photographing effect. The mobile terminal is relatively stable in the tripod state. Therefore, in the tripod state, the mobile terminal sets light sensitivity in an exposure parameter to a value less than or equal to preset light sensitivity.

In other words, in the tripod state, the mobile terminal obtains an image based on relatively lower light sensitivity and a relatively long exposure duration, to improve a photographing effect of the image.

In a possible implementation, exposure durations included in the exposure parameters in the exposure parameter sequence successively increase, or light sensitivity included in the exposure parameters in the exposure parameter sequence successively increases.

For example, assuming that the preset light sensitivity is 200, an exposure duration in the first exposure parameter may be 0.5 s, light sensitivity in the first exposure parameter may be 160, an exposure duration in the second exposure parameter may be 3 s, and light sensitivity in the second exposure parameter may be 200.

Optionally, the exposure parameter sequence may further include at least one fourth exposure parameter sorted in ascending order of photographing time. A photographing time corresponding to any one of the at least one fourth exposure parameter is later than the photographing time corresponding to the first exposure parameter but earlier than the photographing time corresponding to the second exposure parameter.

Optionally, admitted light corresponding to the exposure parameters in the exposure parameter sequence may successively increase in ascending order of photographing time. To be specific, in the exposure sequence, the admitted light corresponding to the first exposure parameter is the smallest, and the admitted light corresponding to the second exposure parameter is the largest. The at least one fourth exposure parameter may be set between the first exposure parameter and the second exposure parameter, so that the admitted light corresponding to the exposure parameters in the exposure sequence successively increases in ascending order of photographing time, to avoid impact on an image synthesis effect arising from a relatively large difference between two consecutive images in a subsequent synthesis processing procedure.

Optionally, a difference between admitted light corresponding to any two exposure parameters in the exposure sequence may be equal to or not equal to a difference between admitted light corresponding to any other two exposure parameters. This is not limited in this embodiment of this application.

For example, assuming that one fourth exposure parameter is included between the first exposure parameter and the second exposure parameter, the exposure duration in the first exposure parameter is 0.5 s, the light sensitivity in the first exposure parameter is 160, the exposure duration in the second exposure parameter is 3 s, and the light sensitivity in the second exposure parameter is 200, an exposure duration in the fourth exposure parameter may be set to 1 s, and light sensitivity in the fourth exposure parameter may be set to 180.

For another example, assuming that two fourth exposure parameters are included between the first exposure parameter and the second exposure parameter, the exposure duration in the first exposure parameter is 0.5 s, the light sensitivity in the first exposure parameter is 160, the exposure duration in the second exposure parameter is 3 s, and the light sensitivity in the second exposure parameter is 200, an exposure duration in a $1^{st}$ fourth exposure parameter may be set to 1 s, and light sensitivity in the $1^{st}$ fourth exposure parameter may be set to 180; and an exposure duration in a $2^{nd}$ fourth exposure parameter may be set to 2 s, and light sensitivity in the $2^{nd}$ fourth exposure parameter may be set to 180.

Figure 6:
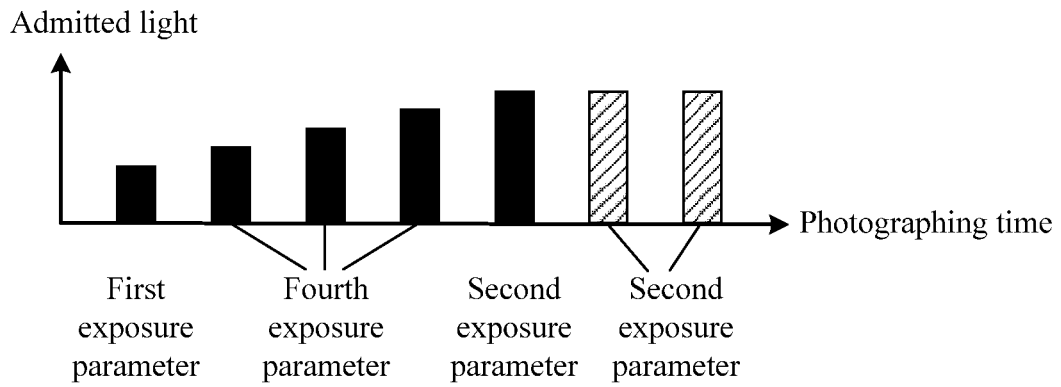
FIG. 6 is a schematic diagram of an exposure parameter sequence in photographing mode 1 according to an embodiment of this application.

FIG. 6 shows a possible implementation of the exposure parameter sequence in photographing mode 1. As indicated by black shadows in FIG. 6, a horizontal direction represents a photographing time corresponding to an exposure parameter, and a vertical direction represents admitted light corresponding to the exposure parameter. This application is not limited thereto.

Optionally, if a pixel value of a region corresponding to the second region in an frame that is obtained by using a largest exposure parameter of the mobile terminal is still less than the second pixel threshold, that is, brightness of an underexposure region is still undesirable, in this case, the mobile terminal may add at least one second exposure parameter (for example, second exposure parameters indicated by slashed shadows in FIG. 6) behind the second exposure parameter, to increase the brightness of the underexposure region.

According to the photographing method provided in this embodiment of this application, in the light source scene, frames of a same photographed object at different exposure levels are obtained by setting different exposure parameters. The first exposure parameter is used to restore image details of a bright region in an frame, and the second exposure parameter is used to restore image details of a dark region in an frame. The frames obtained by using the different exposure parameters are synthesized. In this way, both global details and brightness of a final image are balanced, to improve a dynamic range of the image, thereby improving a photographing effect of the image. In the tripod state, when admitted light is the same, an image noise can be further reduced by setting a relatively long exposure duration and relatively low light sensitivity, so as to improve a photographing effect of an image.

Photographing Mode 2: Handheld and Light Source Mode

If the photographing scene is the light source scene, the mobile terminal determines, based on a pixel mean of a first region in the first image, a pixel mean of a second region in the first image, and an exposure parameter of the first image, a first exposure parameter and a second exposure parameter that are included in the exposure reference sequence.

The first region includes at least two pixels whose pixel values are the largest in the first image, and the second region includes at least two pixels whose pixel values are the smallest in the first image. A pixel mean of a region corresponding to the first region in an frame that is obtained by using the first exposure parameter is equal to a preset first pixel threshold, and the pixel mean of the first region is greater than or equal to the first pixel threshold. A pixel mean of a region corresponding to the second region in an frame that is obtained by using the second exposure parameter is equal to a preset second pixel threshold, and the pixel mean of the second region is less than or equal to the second pixel threshold. The first pixel threshold is greater than the second pixel threshold. A photographing time corresponding to the first exposure parameter is earlier than a photographing time corresponding to the second exposure parameter.

If the photographing status is the handheld state, the mobile terminal determines that the exposure reference sequence includes a reference exposure parameter, and an exposure duration included in the exposure parameters in the exposure sequence is less than or equal to a preset first exposure duration. The reference exposure parameter is an exposure parameter that has the earliest photographing time in the exposure parameter sequence, and admitted light corresponding to the reference exposure parameter is greater than admitted light corresponding to the first exposure parameter but less than admitted light corresponding to the second exposure parameter.

It should be noted that, in this embodiment of this application, the pixel mean of the first region (or the second region) may be understood as a ratio of a sum of pixel values of pixels in the first region (or the second region) to a quantity of the pixels. In a possible alternative manner, the pixel mean of the first region (or the second region) may be replaced with the sum of the pixel values of the pixels in the first region (or the second region). This is not limited in this embodiment of this application.

It should be further noted that, if the pixel mean of the first region is greater than or equal to the preset first pixel threshold, it indicates that the first region is an overexposure region, and brightness of the first region needs to be decreased; and likewise, if the pixel mean of the second region is less than or equal to the preset second pixel threshold, it indicates that the second region is an underexposure region, and brightness of the second region needs to be increased.

For example, assuming that an exposure duration of the first image is 1 s, light sensitivity of the first image is 100, and the first image includes six pixels whose pixel values are 5, 5, 60, 80, 250, and 250 respectively, as shown in FIG. 5, the first region includes two pixels whose pixel values are the largest, that is, the pixel mean of the first region is 250; and the second region includes two pixels whose pixel values are the smallest, that is, the pixel mean of the second region is 5.

It should be understood that, when an exposure parameter includes an exposure duration and light sensitivity, admitted light corresponding to the exposure parameter may be understood as a product of the exposure duration and the light sensitivity.

Assuming that the preset first pixel threshold is 200, because the pixel mean of the first region is 250, and admitted light corresponding to the exposure parameter of the first image is 100, it can be learned that admitted light corresponding to the first exposure parameter is 200×100/250=80.

Assuming that the preset second pixel threshold is 30, because the pixel mean of the second region is 5, and admitted light corresponding to the exposure parameter of the first image is 100, it can be learned that admitted light corresponding to the second exposure parameter is 30×100/5=600.

Because shaking is likely to occur in the handheld mode, the mobile terminal sets an exposure duration of an exposure parameter to a value less than or equal to the preset exposure duration.

In other words, in the handheld state, the mobile terminal obtains an image based on a relatively short exposure duration and relatively high light sensitivity, to improve a photographing effect of the image.

In a possible implementation, exposure durations included in the exposure parameters in the exposure parameter sequence successively increase, and/or light sensitivity included in the exposure parameters in the exposure parameter sequence successively increases.

For example, assuming that the preset exposure duration is 1 s, an exposure duration in the first exposure parameter may be 0.2 s, light sensitivity in the first exposure parameter may be 400, an exposure duration in the second exposure parameter may be 0.5 s, and light sensitivity in the second exposure parameter may be 1200.

For another example, assuming that an exposure duration in the first exposure parameter is 0.2 s, light sensitivity in the first exposure parameter is 400, an exposure duration in the second exposure parameter is 0.5 s, and light sensitivity in the second exposure parameter is 1200, the reference exposure parameter may be set in front of the first exposure parameter. For example, an exposure duration in the reference exposure parameter may be 0.3 s, and light sensitivity in the reference exposure parameter may be 800.

Optionally, the exposure parameter sequence may further include at least one fourth exposure parameter sorted in ascending order of photographing time. A photographing time corresponding to any one of the at least one fourth exposure parameter is later than the photographing time corresponding to the first exposure parameter but earlier than the photographing time corresponding to the second exposure parameter.

Optionally, admitted light corresponding to the exposure parameters in the exposure parameter sequence may successively increase in ascending order of photographing time. To be specific, in the exposure sequence, the admitted light corresponding to the first exposure parameter is the smallest, and the admitted light corresponding to the second exposure parameter is the largest. The at least one fourth exposure parameter may be set between the first exposure parameter and the second exposure parameter, so that the admitted light corresponding to the exposure parameters in the exposure sequence successively increases in ascending order of photographing time, to avoid impact on an image synthesis effect arising from a relatively large difference between two consecutive frames in a subsequent synthesis processing procedure.

Figure 7:
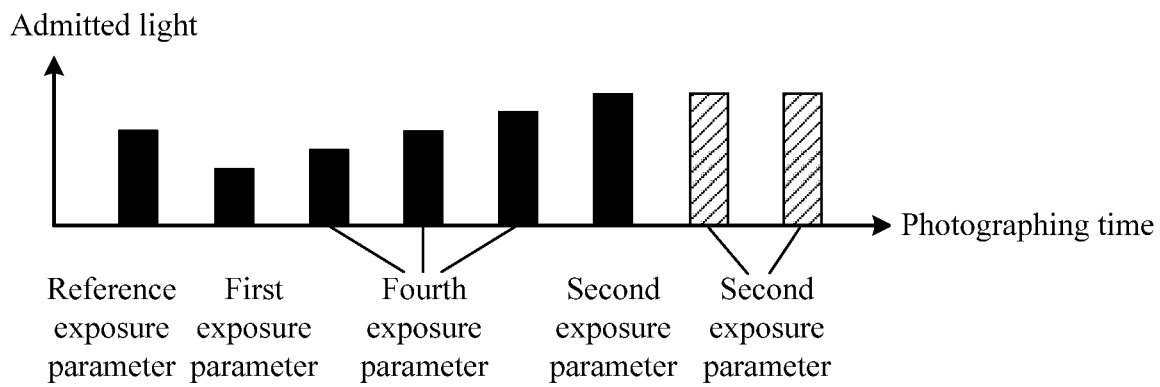
FIG. 7 is a schematic diagram of an exposure parameter sequence in photographing mode 2 according to an embodiment of this application.

FIG. 7 shows a possible implementation of the exposure parameter sequence in photographing mode 2. As indicated by black shadows in FIG. 7, a horizontal direction represents a photographing time corresponding to an exposure parameter, and a vertical direction represents admitted light corresponding to the exposure parameter. This application is not limited thereto.

Optionally, if a pixel mean of a region corresponding to the second region in an image that is obtained by using a largest exposure parameter of the mobile terminal is still less than the preset second pixel threshold, that is, brightness of an underexposure region is still undesirable, in this case, the mobile terminal may add at least one second exposure parameter (for example, second exposure parameters indicated by slashed shadows in FIG. 7) behind the second exposure parameter, to increase the brightness of the underexposure region.

According to the photographing method provided in this embodiment of this application, in the light source scene, changes in brightness of pixels in an image are relatively large, and overexposure or underexposure may occur. Therefore, the mobile terminal may decrease brightness of an overexposure region based on an image that is obtained by using the first exposure parameter, and increase brightness of an underexposure region based on an image that is obtained by using the second exposure parameter, to obtain an image with a high dynamic range through synthesis, so that a supposed-to-be-bright region in the image is bright, a supposed-to-be-dark region in the image is dark, and the image includes more details.

In addition, in the handheld mode, the mobile terminal is not sufficiently stable and is likely to shake. Consequently, a photographed image may be blurred due to shaking, and a plurality of consecutive photographed images cannot be aligned due to shaking. Therefore, an exposure duration needs to be set to a smallest possible value, to avoid a blurred image due to shaking. In addition, a reference exposure parameter needs to be set in the most front of the exposure sequence, and an image that is obtained by using the reference exposure parameter is used to align subsequently photographed images.

Optionally, a quantity of exposure parameters that are included in the exposure parameter sequence in the tripod state may be greater than a quantity of exposure parameters that are included in the exposure parameter sequence in the handheld state.

Photographing Mode 3: Tripod and Dark Mode

If the photographing scene is the dark scene, the mobile terminal determines, based on a pixel mean of the first image and an exposure parameter of the first image, a plurality of third exposure parameters included in the exposure reference sequence.

A pixel mean of an image that is obtained by using the third exposure parameters is equal to a preset third pixel threshold, and the pixel mean of the first image is less than or equal to the preset pixel threshold.

If the photographing status is the tripod state, the mobile terminal determines that light sensitivity included in the exposure parameters in the exposure sequence is less than or equal to preset light sensitivity.

It should be noted that, in this embodiment of this application, the pixel mean of the first image may be understood as a ratio of a sum of pixel values of pixels in the first image to a quantity of the pixels. In a possible alternative manner, the pixel mean of the first image may be replaced with the sum of the pixel values of the pixels in the first image. This is not limited in this embodiment of this application.

It should be further noted that, if the pixel mean of the first image is less than or equal to the preset third pixel threshold, it indicates that the first image is an underexposed image, and brightness of the first image needs to be increased For example, assuming that an exposure duration of the first image is 1 s, light sensitivity of the first image is 100, and the first image includes six pixels whose pixel values are 5, 5, 60, 80, 250, and 250 respectively, as shown in FIG. 5, the pixel mean of the first image is 108.

It should be understood that, when an exposure parameter includes an exposure duration and light sensitivity, admitted light corresponding to the exposure parameter may be understood as a product of the exposure duration and the light sensitivity.

Assuming that the third pixel threshold is 128, because the pixel mean of the first image is 108, and admitted light corresponding to the exposure parameter of the first image is 100, it can be learned that admitted light corresponding to the third exposure parameter is 200×100/250=118.

When admitted light is the same, an image with lower light sensitivity has a smaller image noise and a better photographing effect. The mobile terminal is relatively stable in the tripod mode. Therefore, in the tripod mode, the mobile terminal sets light sensitivity in an exposure parameter to a value less than preset first light sensitivity, and obtains an image based on relatively lower light sensitivity and a relatively long exposure duration.

In conclusion, assuming that the preset first light sensitivity is 100, an exposure duration in the third exposure parameter may be, for example, 1.2 s, and light sensitivity in the third exposure parameter may be, for example, 100.

Figure 8:
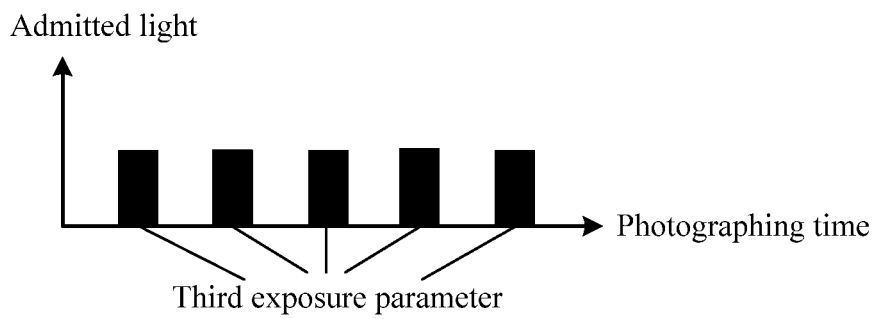
FIG. 8 is a schematic diagram of an exposure parameter sequence in photographing mode 3 according to an embodiment of this application.

FIG. 8 shows a possible implementation of the exposure parameter sequence in photographing mode 3. As shown in FIG. 8, a horizontal direction represents a photographing time corresponding to an exposure parameter, and a vertical direction represents admitted light corresponding to the exposure parameter. This application is not limited thereto.

According to the photographing method provided in this embodiment of this application, in the dark scene, light is relatively weak, image brightness is relatively poor, and overexposure does not occur. Therefore, the mobile terminal may increase brightness of an underexposure region based on an image that is obtained by using the plurality of third exposure parameters, to increase image brightness, so that an image includes more details, thereby improving a photographing effect of the image. In the tripod state, when admitted light is the same, an image noise can be further reduced by setting a relatively long exposure duration and relatively low light sensitivity, so as to improve a photographing effect of an image.

Photographing Mode 4: Handheld and Dark Mode

If the photographing scene is the dark scene, the mobile terminal determines, based on a pixel mean of the first image and an exposure parameter of the first image, a plurality of third exposure parameters included in the exposure reference sequence.

A pixel mean of an image that is obtained by using the third exposure parameters is equal to a preset third pixel threshold, and the pixel mean of the first image is less than or equal to the third pixel threshold.

If the photographing status is the handheld state, the mobile terminal determines that the exposure reference sequence includes a reference exposure parameter, and an exposure duration included in the exposure parameters in the exposure sequence is less than or equal to a preset exposure duration. The reference exposure parameter is an exposure parameter that has the earliest photographing time in the exposure parameter sequence, and admitted light corresponding to the reference exposure parameter is equal to admitted light corresponding to the third exposure parameter.

Figure 9:
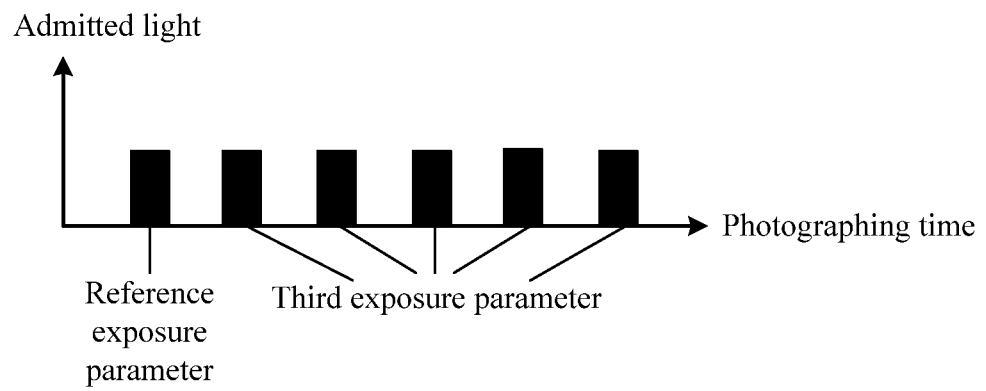
FIG. 9 is a schematic diagram of an exposure parameter sequence in photographing mode 4 according to an embodiment of this application.

FIG. 9 shows a possible implementation of the exposure parameter sequence in photographing mode 4. As shown in FIG. 9, a horizontal direction represents a photographing time corresponding to an exposure parameter, and a vertical direction represents admitted light corresponding to the exposure parameter. This application is not limited thereto.

According to the photographing method provided in this embodiment of this application, in the dark scene, light is relatively weak, image brightness is relatively poor, and overexposure does not occur. Therefore, the mobile terminal may increase brightness of an underexposure region based on an image that is obtained by using the plurality of third exposure parameters, to increase image brightness, so that an image includes more details, thereby improving a photographing effect of the image.

In addition, in the handheld mode, the mobile terminal is not sufficiently stable and is likely to shake. Consequently, a photographed image may be blurred due to shaking, and a plurality of consecutive photographed images cannot be aligned due to shaking. Therefore, an exposure duration needs to be set to a smallest possible value, to avoid a blurred image due to shaking. In addition, a reference exposure parameter needs to be set in the most front of the exposure sequence, and an image that is obtained by using the reference exposure parameter is used to align subsequently photographed images.

S240. The mobile terminal successively obtains images by using the exposure parameters in the exposure parameter sequence, to obtain at least two images.

It should be noted that the at least two images are also sorted in ascending order of photographing time, because the at least two images are successively obtained by the mobile terminal based on the exposure parameters in the exposure parameter sequence, and the exposure parameters in the exposure sequence are sorted in ascending order of photographing time.

It should be further noted that the at least two images obtained in S240 may be at least two images that are obtained immediately after the first image in S210 is obtained.

In other words, after detecting a photographing instruction entered by the user, the mobile terminal may successively obtain the first image in S210 and the at least two images in S240. The first image obtained in S210 is used to determine an exposure parameter sequence for use by the at least two images that are obtained in S240.

S250. The mobile terminal performs synthesis processing based on the photographing mode and some or all of the at least two images, to obtain a target image.

The following describes how the mobile terminal performs synthesis processing based on some or all of the at least two images in different photographing modes, to obtain the target image.

Photographing Mode 1: Tripod and Light Source Mode

It should be noted that, assuming that the at least two frames include N frames, and N is an integer greater than 1, the synthesis processing includes pixel superposition processing and frame blending processing in photographing mode 1.

Specifically, the mobile terminal performs pixel superposition processing on an $i^{th}$ frame in the N frames and a synthesis processing result of first i−1 frames, to obtain a pixel superposition processing result of first i frames, where a value of i is 2, 3, . . . , or N; the terminal device performs frame blending processing on the $i^{th}$ frame and the pixel superposition processing result of the first i frames, to obtain an $i^{th}$ candidate target image; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be noted that, when the value of i is 2, a synthesis processing result of first one image may be understood as a first candidate target image, or a pixel superposition processing result of first one image, or a $1^{st}$ image.

In a possible implementation, that the mobile terminal performs pixel superposition processing on the $i^{th}$ frame and the synthesis processing result of the first i−1 frames may be understood as that the mobile terminal performs pixel superposition processing on the $i^{th}$ frame and the synthesis processing result of the first i−1 frames based on a preset first weight of the synthesis processing result of the first i−1 frames and a preset second weight of the $i^{th}$ frame. A sum of the preset first weight and the preset second weight is greater than 1 but less than 2.

For example, the preset first weight is equal to 1, and the preset second weight is greater than 0 but less than 1; or both the preset first weight and the preset second weight are greater than 0 but less than 1.

For example, assuming that a pixel value of a $1^{st}$ pixel (a pixel in row 1 and column 1) in a $1^{st}$ frame is 60, the preset first weight is 1, a pixel value of a $1^{st}$ pixel in a $2^{nd}$ frame is 80, and the preset second weight is 0.4, a pixel value of a $1^{st}$ pixel in a pixel superposition processing result, obtained after pixel superposition processing is performed on the $1^{st}$ frame and the $2^{nd}$ frame, of first two frames is 60×1+80×0.4=92.

In a possible implementation, the mobile terminal determines, according to a preset first rule, a weight of a pixel in the pixel superposition result of the first i frames and a weight of a pixel in the $i^{th}$ frame, where the preset first rule includes: A pixel closer to a brightness center (for example, a pixel whose pixel value is 128) has a larger weight, and a pixel farther away from the brightness center has a smaller weight; and performs frame blending processing on the $i^{th}$ frame and the pixel superposition result of the first i frames based on the weight of the pixel in the pixel superposition result of the first i frames and the weight of the pixel in the $i^{th}$ frame, to obtain the $i^{th}$ candidate target image.

For another example, assuming that a pixel value of a $1^{st}$ pixel (a pixel in row 1 and column 1) in a pixel superposition processing result of first two frames is 92, a weight, obtained according to the preset first rule, of the $1^{st}$ pixel in the pixel superposition processing result of the first two frames is 0.6, a pixel value of a $1^{st}$ pixel in a $2^{nd}$ frame is 80, and a weight, obtained according to the preset first rule, of the $1^{st}$ pixel in the $2^{nd}$ frame is 0.4, when frame blending processing is performed on the $2^{nd}$ frame and the pixel superposition processing result of the first two frames, the weights of the two frames are first normalized (0.6:0.4=3/5:2/5), and then superposition is performed, that is, a pixel value of a $1^{st}$ pixel in the $2^{nd}$ candidate target frame is 3/5×92+2/5×80=87.2.

In other words, the mobile terminal first performs pixel superposition processing on the $i^{th}$ frame in the N frames and the synthesis processing result of the first i−1 frames, so as to improve image brightness; and then performs frame blending processing on the $i^{th}$ frame and the superposition processing result of the first i frames, so that all regions in an entire image approach a brightness center. Finally, a dynamic range of an image that is obtained after synthesis is improved, and a photographing effect of the image is improved.

It should be noted that, in the foregoing examples, a pixel superposition processing procedure and an frame blending processing procedure are described by using pixels at corresponding locations in the $1^{st}$ frame and the $2^{nd}$ frame. A processing procedure of pixels at corresponding locations in two frames is similar to the foregoing procedures. To avoid repetition, details are not described herein again.

Optionally, if the mobile terminal does not detect, within the preset first duration, a synthesis processing end instruction that is entered based on the second prompt information by the user, the mobile terminal performs synthesis processing on an $(i+1)^{th}$ frame in the N frames and a synthesis result of the first i frames, to obtain an $(i+1)^{th}$ candidate target image; and the mobile terminal displays the $(i+1)^{th}$ candidate target image and the second prompt information to the user by using the display interface.

Optionally, if the mobile terminal does not receive, within the preset first duration after displaying an $N^{th}$ candidate target image to the user by using the display interface, a synthesis processing end instruction that is entered by the user, the mobile terminal determines the $N^{th}$ candidate target image as the target image.

In other words, in a procedure of successively performing, by the mobile terminal, synthesis processing on the at least two frames, each time synthesis is performed, a synthesis processing result of the synthesis is displayed to the user by using the display interface, and the user is prompted to output or not to output the synthesis result of the synthesis as the target image; and if a synthesis processing end instruction from the user is detected within the preset first duration after the user is prompted, the synthesis result obtained this time is output as the target image; otherwise, synthesis continues to be performed on a next image, until last synthesis is completed.

Optionally, before the mobile terminal performs synthesis processing on the $1^{st}$ frame and the $2^{nd}$ frame, the mobile terminal may display the $1^{st}$ frame to the user by using the display interface; and if the mobile terminal detects, within the preset first duration, a synthesis processing end instruction that is entered based on the second prompt information by the user, the mobile terminal stops the synthesis processing, and determines the $1^{st}$ frame as the target image; or if the mobile terminal does not detect a synthesis processing end instruction within the preset first duration, the mobile terminal performs synthesis processing on the $1^{st}$ frame and the $2^{nd}$ frame.

Photographing Mode 2: Handheld and Light Source Mode

It should be noted that, assuming that the at least two frames include N frames, and N is an integer greater than 1, the synthesis processing includes frame registration processing, pixel superposition processing, and frame blending processing in photographing mode 1.

Specifically, the mobile terminal performs frame registration processing on an $i^{th}$ frame in the N frames based on an frame that is obtained by using the reference exposure parameter, to obtain an $i^{th}$ frame registration processing result; the mobile terminal performs pixel superposition processing on the $i^{th}$ frame registration processing result and a synthesis processing result of first i−1 frames, to obtain an $i^{th}$ pixel superposition processing result, where a value of i is 2, 3, . . . , or N; the terminal device performs frame blending processing on the $i^{th}$ pixel superposition processing result and the $i^{th}$ frame, to obtain an $i^{th}$ candidate target image; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be noted that a difference between photographing mode 2 and photographing mode 1 lies in the following: In photographing mode 2, the mobile terminal is in the handheld state; therefore, before each frame is synthesized, frame registration processing needs to be performed on the frame and a reference frame that is obtained by using a reference exposure parameter, to avoid inter-frame jitter caused by the handheld state, that is, all frames except the reference frame need to be aligned with the reference frame.

In addition, there may be an unaligned edge region after the frame registration processing. An frame registration processing result may be cropped or magnified, to remove the unaligned edge region.

Specifically, frame registration may be performed by using an frame registration method in the prior art. This is not limited in this embodiment of this application.

Optionally, because shaking and blurring may occur in the handheld state, each frame may be sharpened in a synthesis processing procedure, to improve image definition.

It should be understood that a pixel superposition processing procedure and an frame blending processing procedure in photographing mode 2 are the same as the pixel superposition processing procedure in photographing mode 1. For detailed processing, refer to photographing mode 1. To avoid repetition, details are not described herein again.

Photographing Mode 3: Tripod and Dark Mode

It should be noted that, assuming that the at least two frames include N frames, and N is an integer greater than 1, the synthesis processing includes pixel superposition processing in photographing mode 1.

Specifically, the mobile terminal performs pixel superposition processing on an $i^{th}$ frame in the N frames and a synthesis processing result of first i−1 frames, to obtain an $i^{th}$ candidate target image, where a value of i is 2, 3, . . . , or N; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be understood that a pixel superposition processing procedure in photographing mode 3 is the same as the pixel superposition processing procedure in photographing mode 1. For detailed processing, refer to photographing mode 1. To avoid repetition, details are not described herein again.

Photographing Mode 4: Handheld and Dark Mode

It should be noted that, assuming that the at least two frames include N frames, and N is an integer greater than 1, the synthesis processing includes frame registration processing and pixel superposition processing in photographing mode 1.

Specifically, the terminal device performs frame registration processing on an $i^{th}$ frame in the N frames based on an frame that is obtained by using the reference exposure parameter, to obtain an $i^{th}$ frame registration processing result; the mobile terminal performs pixel superposition processing on the $i^{th}$ frame registration processing result and a synthesis processing result of first i−1 frames, to obtain an $i^{th}$ candidate target image, where a value of i is 2, 3, . . . , or N; the mobile terminal displays the $i^{th}$ candidate target image and second prompt information to the user by using the display interface, where the second prompt information is used to prompt the user to end or not to end the synthesis processing; and if the mobile terminal detects, within a preset first duration, a synthesis processing end instruction that is entered based on the second prompt information by the user, the mobile terminal stops the synthesis processing, and determines the $i^{th}$ candidate target image as the target image.

It should be understood that an frame registration processing procedure and a pixel superposition processing procedure in photographing mode 3 are the same as the pixel superposition processing procedure in photographing mode 1. For detailed processing, refer to photographing mode 1. To avoid repetition, details are not described herein again.

S260. The mobile terminal outputs the target image.

To be specific, the mobile terminal may use the target image as an image to be finally stored into a gallery after current photographing.

In other words, the mobile terminal may store the target image into a memory.

The following describes in detail, with reference to FIG. 10 to FIG. 17, how the display interface of the mobile terminal is presented in a process of performing the photographing method provided in this embodiment of this application.

For example, when a user needs to take a photo, the user may instruct an electronic device to start a camera. For example, the user may instruct, by tapping a camera icon, the electronic device to start the camera; or the user may instruct, in a voice manner, the electronic device to start the camera; or the user may instruct, by drawing a "C"-shaped track on a screen in a screen-off state, the electronic device to start the camera. A manner of triggering the electronic device to start the camera is not limited in this embodiment of this application.

Figure 10:
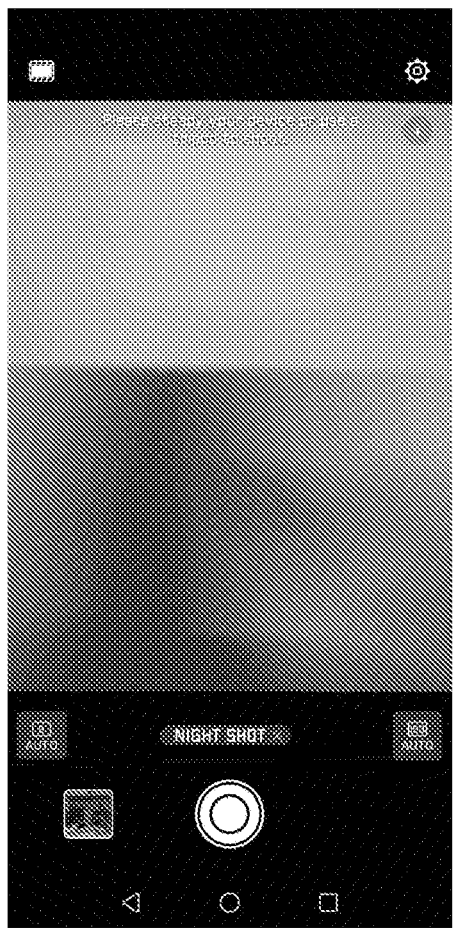
FIG. 10 is a schematic diagram of a preview interface according to an embodiment of this application.

After the user starts the camera, the mobile terminal displays a display interface shown in FIG. 10. The display interface includes a current previewed image, photographing status prompt information, photographing scene prompt information, a shutter icon, exposure parameter prompt information, and the like. This is not limited in this embodiment of this application.

In a possible implementation, on the display interface shown in FIG. 10, the photographing status prompt information may be in a text form, an icon form, or another form, such as a voice prompt, that can prompt the user with a current photographing status. This is not limited in this embodiment of this application.

For example, the display interface may display "use a tripod to shoot (use a tripod to shoot)", "please steady your device (please steady your device)", or the like.

For another example, the display interface may display a "tripod" icon and a "no shaking" icon.

In a possible implementation, on the display interface shown in FIG. 10, the photographing scene prompt information may be in a text form, an icon form, or another form, such as a voice prompt, that can prompt the user with a current photographing scene. This is not limited in this embodiment of this application.

For example, the display interface may display "night shot (night shot)", "highlight shot", "dark shot", or "light shot".

For another example, the display interface may display a "sun" icon to indicate that there is a light source, and indicate intensity of the current light source by using a quantity of sunrays in the "sun" icon; or display a "moon" icon to indicate a night shot.

In a possible implementation, on the display interface shown in FIG. 10, the exposure parameter prompt information may be in a text form, an icon form, or another form, such as a voice prompt, that can prompt the user with a current exposure parameter. This is not limited in this embodiment of this application.

For example, the display interface may display "exposure duration T:  seconds (milliseconds)", "light sensitivity ISO: ", or "aperture value F: ***".

For another example, the display interface may display an "automatic exposure duration setup (auto) mode" icon, an "automatic ISO setup mode" icon, or an "automatic aperture value setup mode" icon.

Optionally, the exposure parameter may be in an automatic setup mode, or may be in a manual user setup mode, or may be in a semi-automatic and semi-manual mode. This is not limited in this embodiment of this application.

Figure 11:
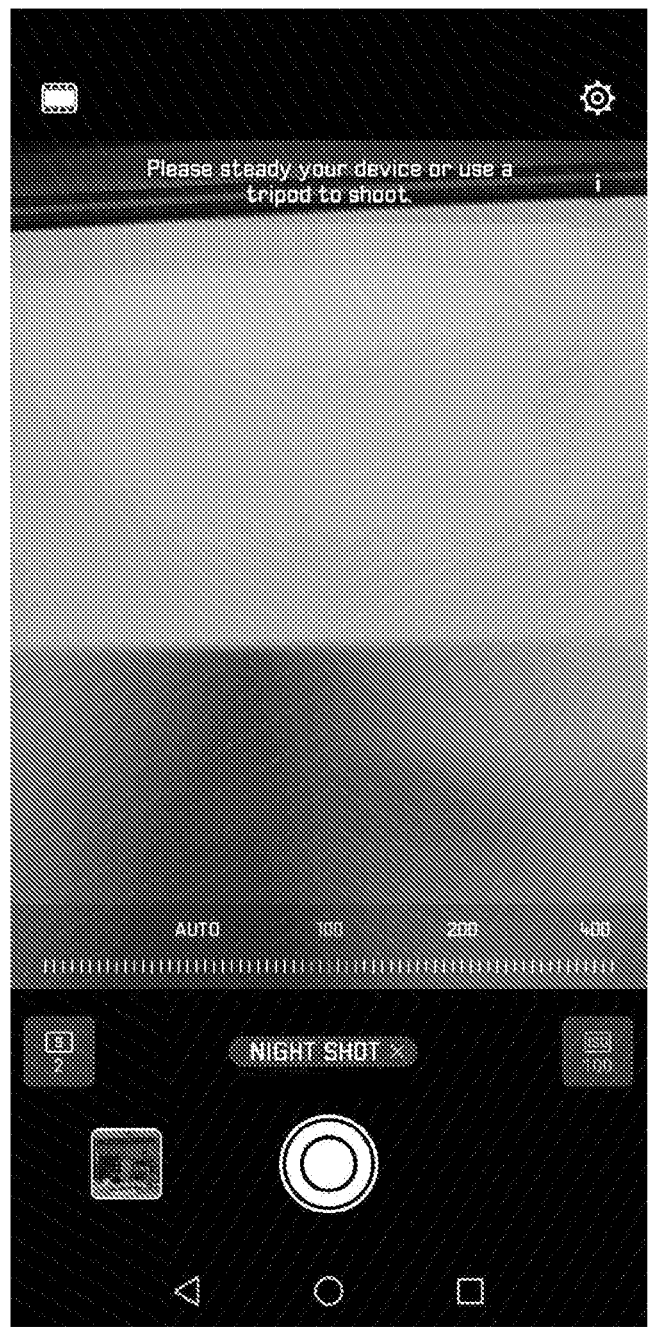
FIG. 11 is a schematic diagram of another preview interface according to an embodiment of this application.

For example, as shown in FIG. 11, the display interface may display an "ISO" icon. After tapping the icon, the user may manually set ISO.

It should be understood that FIG. 11 shows merely an example of the display interface that is displayed after the camera starts. The display interface in FIG. 11 may further include another part on an existing display interface, such as an album preview screen, a home key, a back key, or a menu key. This embodiment of this application should not be limited thereto.

When the user needs to take a photo, the user taps a shutter. In this case, the mobile terminal prompts, based on a detected photographing instruction entered by the user, the user to steady the device, obtains a previewed image, determines a current photographing mode, determines an exposure parameter sequence based on the previewed image and the photographing mode, and obtains at least two frames corresponding to the exposure parameter sequence.

After the mobile terminal determines the current photographing mode, the mobile terminal may prompt the user with the current photographing mode by using the display interface.

Figure 12:
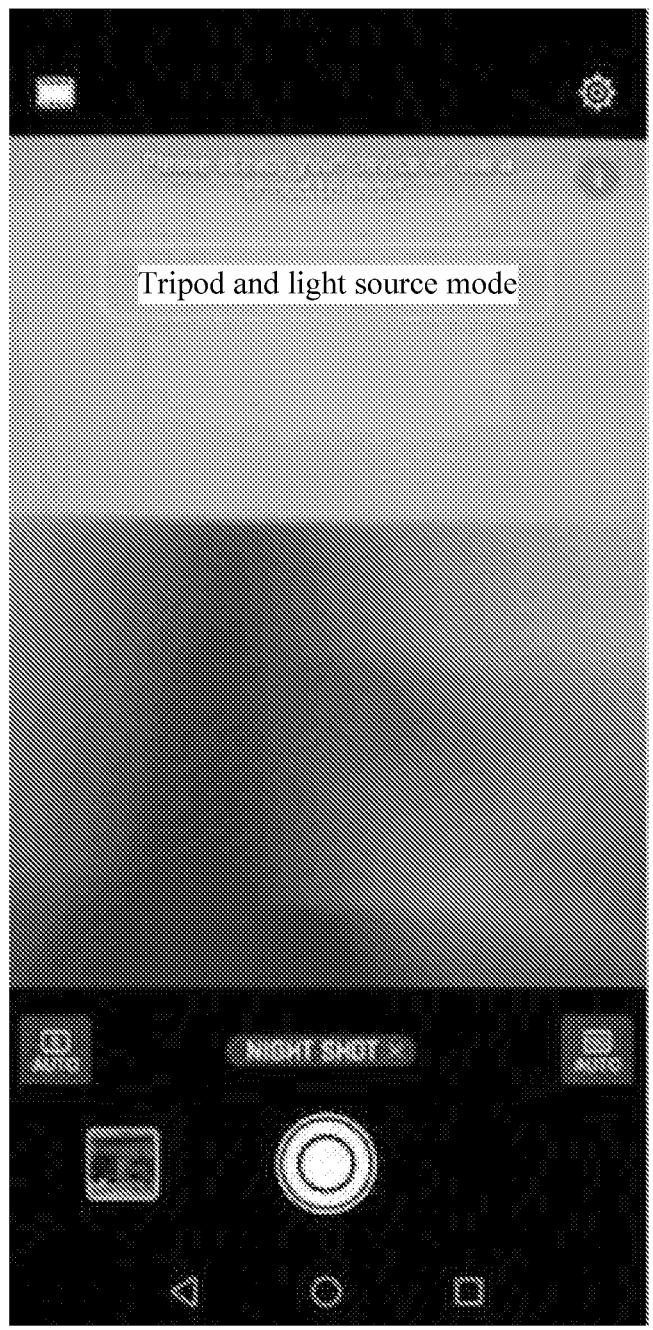
FIG. 12 is a schematic diagram of a display interface of first prompt information according to an embodiment of this application.

For example, as shown in FIG. 12, the display interface prompts the user that the current photographing mode is a tripod and light source mode.

For example, if the at least two frames are an frame 1, an frame 2, an frame 3, and an frame 4, FIG. 13 to FIG. 16 show possible display manners of the display interface in a process of performing, by the mobile terminal after obtaining the at least two frames based on the exposure parameters, synthesis processing based on the at least two frames. However, this embodiment of this application should not be limited thereto.

Figure 13:
FIG. 13 is a schematic diagram of a display interface in a photographing process according to an embodiment of this application.
Figure 14:
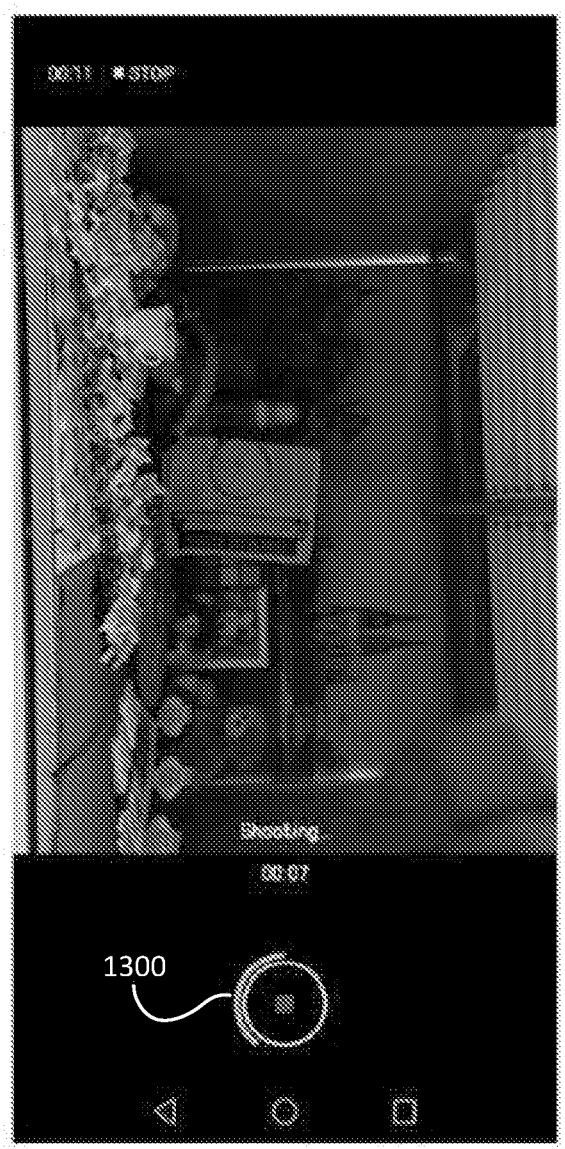
FIG. 14 is a schematic diagram of another display interface in a photographing process according to an embodiment of this application.
Figure 15:
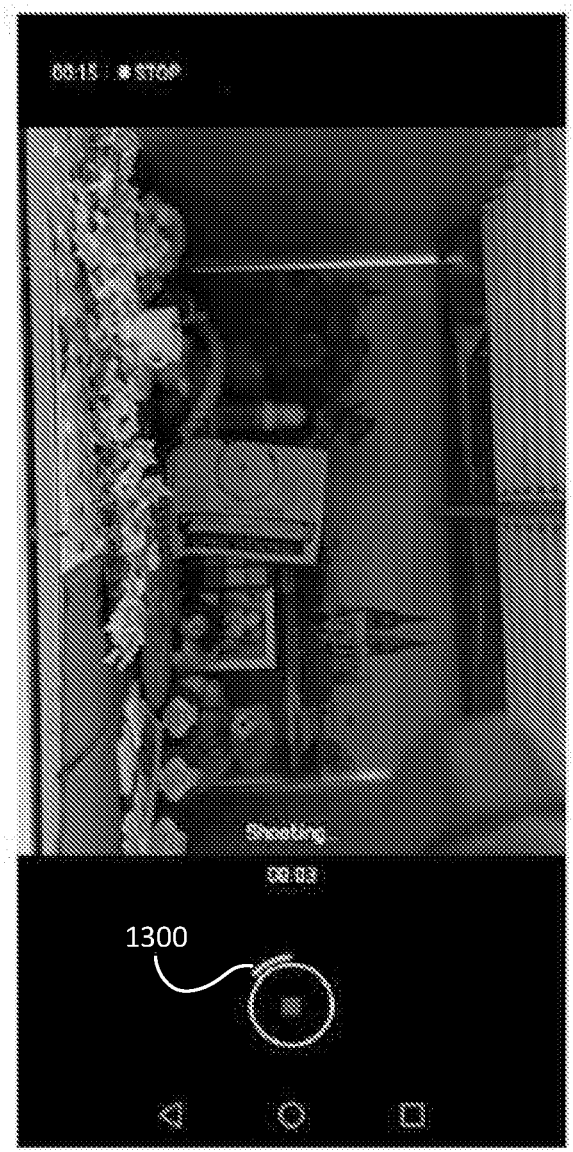
FIG. 15 is a schematic diagram of still another display interface in a photographing process according to an embodiment of this application.
Figure 16:
FIG. 16 is a schematic diagram of yet another display interface in a photographing process according to an embodiment of this application.

FIG. 13 shows a $1^{st}$ candidate target image (the frame 1). FIG. 14 shows a $2^{nd}$ candidate target image (which is a synthesis result of the frame 1 and the frame 2). FIG. 15 shows a $3^{rd}$ candidate target image (which is a synthesis result of the $2^{nd}$ candidate target image and the frame 3). FIG. 16 shows a $4^{th}$ candidate target image (which is a synthesis result of the $3^{rd}$ candidate target image and the frame 4), namely, a final target image.

Optionally, the display interface may further prompt the user that shooting (shooting) or processing is ongoing.

Optionally, the display interface may further include a count of a synthesis processing countdown, and display a countdown progress bar 1300 for the user (the countdown progress bar 1300 is shown and labeled in FIGS. 13-15 and 17).

Optionally, the display interface may further display a duration already used in current synthesis processing.

Optionally, the display interface may further prompt the user with a specific image on which synthesis is being performed.

Optionally, the display interface may further prompt the user with a currently obtained candidate target image, and a quantity of obtained candidate target images.

Figure 17:
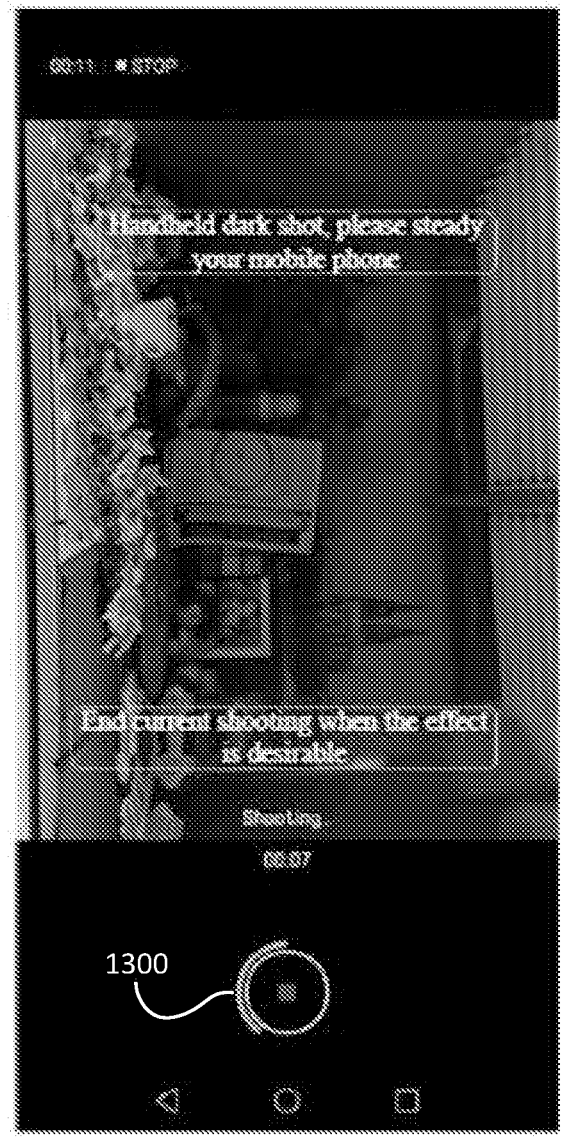
FIG. 17 is a schematic diagram of a display interface of second prompt information according to an embodiment of this application.

For another example, FIG. 17 shows an example of a possible display interface of the second prompt information. The mobile terminal may prompt, by using the display interface, the user to end current photographing upon a satisfactory effect; and provide an end icon. The second prompt information may be displayed on any one of the display interfaces in FIG. 13 to FIG. 16 to prompt the user. When the user presses an end button, frame synthesis processing ends, and a candidate target image displayed on a current display interface is displayed to the user as a final target image, and is stored into the gallery.

Optionally, FIG. 13 and FIG. 17 show merely an example of changes of the display interface in a photographing process of the mobile terminal. In a photographing process, the display interface of the mobile terminal may further display another change process related to photographing and synthesis processing. This embodiment of this application should not be limited thereto.

Figure 18:
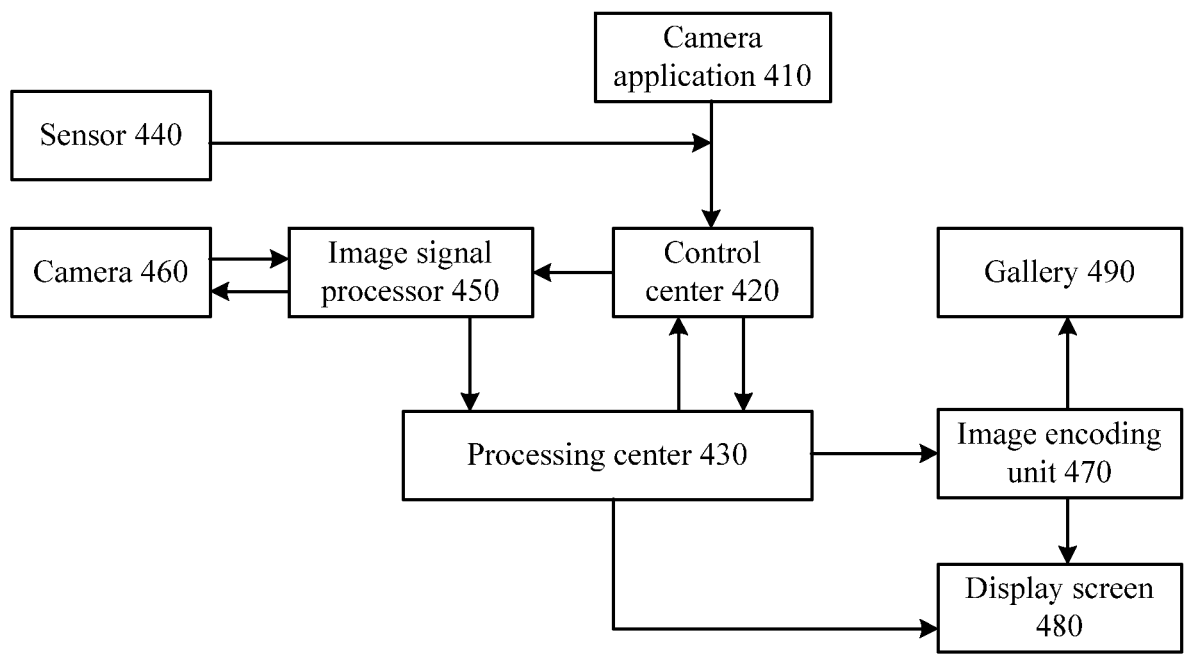
FIG. 18 is a schematic diagram of a system architecture according to an embodiment of this application.

With reference to FIG. 18, the following describes a schematic diagram of a system architecture 400 provided in an embodiment of this application. The system structure is used to implement the method provided in the method 400.

A camera application (Application, APP) 410 is configured to obtain a camera startup instruction entered by a user, and provide a photographing function for the user.

A control center 420 is configured to detect a photographing instruction entered by the user; and after detecting the photographing instruction, request an initial exposure parameter from a processing center 430, and request a sensor parameter from a sensor 440.

In a possible implementation, the control center 420 may be, for example, an operating system of a mobile terminal.

The processing center 430 is configured to deliver the initial exposure parameter to the control center 420 according to a request of the control center 420.

In a possible implementation, the processing center 430 may be, for example, a background processing module used with a camera.

The control center 420 is further configured to deliver the initial exposure parameter to an image signal processor (image signal processor, ISP) 450 based on the received initial exposure parameter, and instruct the ISP 450 to capture a previewed image based on the initial exposure parameter.

The ISP 450 is configured to control a camera 460 to obtain a previewed image based on the initial parameter, and send the previewed image to the processing center 430.

In a possible implementation, the ISP 450 may be, for example, hardware configured to perform camera parameter configuration and perform processing, such as format processing, on an image output by the camera.

The sensor 440 is configured to send sensor data to the control center 420 according to a request of the control center 420.

The control center 420 is further configured to send, to the processing center 430, the sensor data that is obtained from the sensor 440 and the previewed image that is obtained from the ISP 450.

The processing center 430 is further configured to: (1) send, to an image encoding unit 470, the previewed image that is obtained from the control center 420 for encoding; (2) determine a current photographing mode, and instruct a display screen to display the current photographing mode; and (3) determine an exposure parameter sequence based on the obtained previewed image and the obtained sensor data, and send the exposure parameter sequence to the control center 420.

In the process (1), the image encoding unit 470 is configured to encode the previewed image sent by the control center 430, and then send an encoded previewed image to a display screen 480. The display screen 480 is configured to display, to the user, the previewed image sent by the image encoding unit 470.

In the process (2), the display screen 480 is further configured to display the current photographing mode to the user.

In the process (3), the control center 420 is further configured to deliver the obtained exposure parameter sequence to the ISP 450.

The ISP 450 is further configured to control, based on the exposure parameter sequence, the camera to capture at least two frames corresponding to the exposure parameter sequence, and is configured to send the captured at least two frames to the processing center 430.

The processing center 430 is further configured to: perform frame synthesis processing based on the obtained at least two frames and the photographing mode; each time an frame is obtained through synthesis, send the frame to the frame encoding unit 470, and display the frame by using the display screen 480; and after a final target image is determined, store the target image into a gallery 490.

Figure 19:
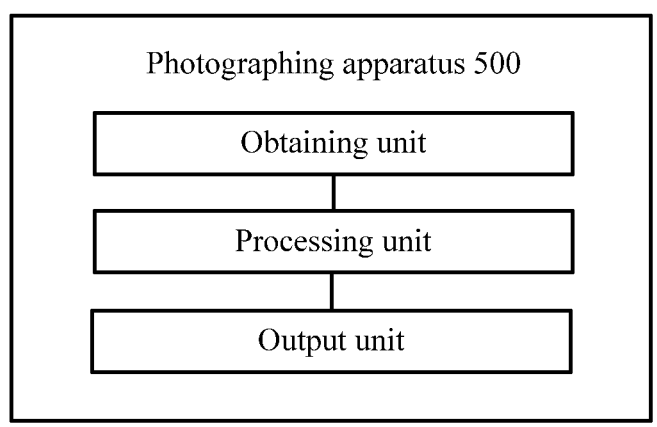
FIG. 19 is a schematic block diagram of a photographing apparatus according to an embodiment of this application.

FIG. 19 is a schematic block diagram of a photographing apparatus 500 according to an embodiment of this application. The photographing apparatus 500 may correspond to the terminal device described in the method 200, and modules or units in the photographing apparatus 500 are configured to perform the actions and processing procedures performed by the terminal device in the method 200. Herein, to avoid repetition, detailed descriptions thereof are omitted.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, that is, may be located in one position, or may be distributed on a plurality of network units. Some or all of the units may be selected depending on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a processor; and
   a memory coupled to the processor and storing instructions, which when executed by the processor, cause the electronic device to:
   enter a night shot mode;
   determine that a current photographing scene is a dark scene or a light source scene;
   display a preview interface indicating that the electronic device is in the night shot mode;
   receive a photographing instruction when the preview interface is displayed;
   display a photographing interface in response to receiving the photographing instruction, wherein the photographing interface displays a progress indication indicating that the electronic device is performing processing to generate a target image and displays an indication prompting a user to keep the electronic device steady;
   perform processing to generate the target image, wherein the processing comprises:
   processing a first set of frames for synthesizing the target image when the electronic device is in a steady state and in the light source scene, wherein the first set of frames is obtained based on first exposure parameters; or
   processing a second set of frames for synthesizing the target image when the electronic device is in a handheld state and in the light source scene, wherein the second set of frames is obtained based on second exposure parameters; or
   processing a third set of frames for synthesizing the target image when the electronic device is in the steady state and in the dark scene, wherein the third set of frames is obtained based on third exposure parameters; or
   processing a fourth set of frames for synthesizing the target image when the electronic device is in the handheld state and in the dark scene, wherein the fourth set of frames is obtained based on fourth exposure parameters,
   wherein the first exposure parameters are different from the second exposure parameters, wherein the third exposure parameters are different from the fourth exposure parameters, wherein the first exposure parameters are different from the third exposure parameters, and wherein the second exposure parameters are different from the fourth exposure parameters; and
   save the target image.

2. The electronic device of claim 1, wherein the instructions further cause the electronic device to:
   determine a quantity of first pixels in a preview image having brightness values greater than a preset brightness value; and
   determine that the current photographing scene is the dark scene when a ratio of the quantity of first pixels of the preview image to a quantity of all pixels of the preview image is less than a preset ratio value.

3. The electronic device of claim 1, wherein the instructions further cause the electronic device to:
   determine a quantity of first pixels in a preview image having brightness values greater than a preset brightness value; and
   determine that the current photographing scene is the light source scene when a ratio of the quantity of first pixels of the preview image to a quantity of all pixels of the preview image is greater than a preset ratio value.

4. The electronic device of claim 1, wherein a first exposure duration when the electronic device is in the handheld state is shorter than a second exposure duration when the electronic device is in the steady state, and wherein a first light sensitivity when the electronic device is in the handheld state is greater than a second light sensitivity when the electronic device is in the steady state.

5. The electronic device of claim 1, wherein a quantity of the first set of frames is different from a quantity of the second set of frames, or a quantity of the third set of frames is different from a quantity of the fourth set of frames.

6. The electronic device of claim 1, wherein exposure durations included in the first exposure parameters successively increase in ascending order of photographing time, or light sensitivities included in the first exposure parameters successively increase in ascending order of the photographing time.

7. The electronic device of claim 1, wherein admitted light values corresponding to the first exposure parameters successively increase in ascending order of photographing time.

8. The electronic device of claim 1, wherein the instructions further cause the electronic device to set two exposure parameters included in the first exposure parameters, the second exposure parameters, the third exposure parameters, or the fourth exposure parameters to correspond to a same admitted light value.

9. The electronic device of claim 1, wherein the instructions further cause the electronic device to:
   display a first candidate target image in the photographing interface at a first time; and
   display a second candidate target image in the photographing interface at a second time, wherein the second time is after the first time, and wherein a first brightness value of the first candidate target image is lower than a second brightness value of the second candidate target image.

10. A computer program product comprising instructions stored on a non-transitory computer-readable medium that, when executed by a processor, cause an electronic device to:
enter a night shot mode;
determine that a current photographing scene is a dark scene or a light source scene;
determine that a current photographing state is a steady state or a handheld state;
display a preview interface indicating that the electronic device is in the night shot mode;
receive a photographing instruction when the preview interface is displayed;
display a photographing interface in response to receiving the photographing instruction,
wherein the photographing interface displays a progress indication indicating that the electronic device is performing processing to generate a target image and displays an indication prompting a user to keep the electronic device steady;
perform processing to generate the target image wherein the processing comprises:
processing a first set of frames for synthesizing the target image using first exposure parameters when the electronic device is in the steady state and in the light source scene, wherein the first set of frames is obtained based on the first exposure parameters;
processing a second set of frames for synthesizing the target image using second exposure parameters when the electronic device is in the handheld state and in the light source scene, wherein the second set of frames is obtained based on the second exposure parameters;
processing a third set of frames for synthesizing the target image using third exposure parameters when the electronic device is in the steady state and in the dark scene, wherein the third set of frames is obtained based on the third exposure parameters;
processing a fourth set of frames for synthesizing the target image using fourth exposure parameters when the electronic device is in the handheld state and in the dark scene, wherein the fourth set of frames is obtained based on the fourth exposure parameters, wherein the first exposure parameters are different from the second exposure parameters, wherein the third exposure parameters are different from the fourth exposure parameters, wherein the first exposure parameters are different from the third exposure parameters, and wherein the second exposure parameters are different from the fourth exposure parameters; and
save the target image.

11. The computer program product of claim 10, wherein the instructions further cause the electronic device to:
determine a quantity of first pixels in a preview image having brightness values greater than a preset brightness value; and
determine that the current photographing scene is the dark scene when a ratio of the quantity of first pixels of the preview image to a quantity of all pixels of the preview image is less than a preset ratio value.

12. The computer program product of claim 10, wherein the instructions further cause the electronic device to:
determine a quantity of first pixels in a preview image having brightness values greater than a preset brightness value; and
determine that the current photographing scene is the light source scene when a ratio of the quantity of first pixels of the preview image to a quantity of all pixels of the preview image is greater than a preset ratio value.

13. The computer program product of claim 10, wherein a first exposure duration when the electronic device is in the handheld state is shorter than a second exposure duration when the electronic device is in the steady state, and wherein a first light sensitivity when the electronic device is in the handheld state is greater than a second light sensitivity when the electronic device is in the steady state.

14. The computer program product of claim 10, wherein a first quantity of exposure parameters when the electronic device is in the handheld state is different from a second quantity of exposure parameters when the electronic device is not in the handheld state.

15. The computer program product of claim 10, wherein exposure durations included in the first exposure parameters successively increase in ascending order of photographing time, or light sensitivities included in the first exposure parameters successively increase in ascending order of the photographing time.

16. The computer program product of claim 10, wherein admitted light values corresponding to the first exposure parameters successively increase in ascending order of photographing time.

17. A photographing method implemented by an electronic device, comprising:
entering a night shot mode;
determining that a current photographing scene is a dark scene or a light source scene;
displaying a preview interface indicating that the electronic device is in the night shot mode;
receiving a photographing instruction when the preview interface is displayed;
displaying a photographing interface in response to receiving the photographing instruction, wherein the photographing interface displays a progress indication indicating that the electronic device is performing processing to generate a target image and displays an indication prompting a user to keep the electronic device steady;
performing processing to generate the target image, wherein the processing comprises:
processing a first set of frames for synthesizing the target image using first exposure parameters when the electronic device is in a steady state and in the light source scene, wherein the first set of frames is obtained based on the first exposure parameters;
processing a second set of frames for synthesizing the target image using second exposure parameters when the electronic device is in a handheld state and in the light source scene, wherein the second set of frames is obtained based on the second exposure parameters;
processing a third set of frames for synthesizing the target image using third exposure parameters when the electronic device is in the steady state and in the dark scene, wherein the third set of frames is obtained based on the third exposure parameters;
processing a fourth set of frames for synthesizing the target image using fourth exposure parameters when the electronic device is in the handheld state and in the dark scene, wherein the fourth set of frames is obtained based on the fourth exposure parameters, wherein the first exposure parameters are different from the second exposure parameters, wherein the third exposure parameters are different from the fourth exposure parameters, wherein the first exposure parameters are different from the third exposure parameters, and wherein the second exposure parameters are different from the fourth exposure parameters; and saving the target image.

18. The electronic device of claim 1, wherein the instructions further cause the electronic device to obtain a previewed first image, wherein the previewed first image comprises a first region and a second region, and wherein when the photographing scene is the light source scene, the first region comprises at least two pixels whose pixel values are the largest in the previewed first image, the second region comprises at least two pixels whose pixel values are the smallest in the previewed first image, a pixel mean of a region corresponding to the first region in a first frame that is obtained by using a first exposure parameter is less than or equal to the pixel mean of the first region, and a pixel mean of a region corresponding to the second region in another first frame that is obtained by using another first exposure parameter is greater than or equal to the pixel mean of the second region.

19. The electronic device of claim 1, wherein the instructions further cause the electronic device to:
receive a synthesis processing end instruction within a preset duration; and
synthesize the target image using a part of the first set of frames, the second set of frames, the third set of frames, or the fourth set of frames in response to receiving the synthesis processing end instruction.

20. The electronic device of claim 1, wherein the instructions further cause the electronic device to determine that a current photographing state is the steady state or the handheld state.

* * * * *